United States Patent [19]

Patton et al.

[11] Patent Number: 5,654,840

[45] Date of Patent: Aug. 5, 1997

[54] HARD DISK DRIVE WHICH USES THE BACK EMF OF THE ACTUATOR TO DETECT SHOCKS

[75] Inventors: Charles R. Patton, Murietta; John R. Edwards, Mountain View; Anil Sareen, Mission Viejo, all of Calif.

[73] Assignee: Western Digital Corporation, Irvine, Calif.

[21] Appl. No.: 269,332

[22] Filed: Jun. 30, 1994

[51] Int. Cl.⁶ .................................................. G11B 21/02
[52] U.S. Cl. .......................... 360/75; 360/60; 318/601; 318/635
[58] Field of Search .............................. 318/460, 560, 318/601, 624, 635; 360/69, 75, 77.01, 77.03, 78.09, 78.11, 60; 388/928.1

[56] References Cited

U.S. PATENT DOCUMENTS

| | | | |
|---|---|---|---|
| 4,862,298 | 8/1989 | Genheimer et al. | 360/75 X |
| 4,864,437 | 9/1989 | Couse et al. | 360/75 |
| 4,933,785 | 6/1990 | Morehouse et al. | 360/78.04 |
| 4,947,093 | 8/1990 | Dunstan et al. | 318/560 |
| 5,227,929 | 7/1993 | Comerford | 360/75 |
| 5,235,472 | 8/1993 | Smith | 360/69 X |
| 5,296,790 | 3/1994 | Fincher | 318/560 |
| 5,299,075 | 3/1994 | Hanks | 360/75 X |
| 5,333,138 | 7/1994 | Richards et al. | 360/75 X |
| 5,491,394 | 2/1996 | Harwood et al. | 360/69 X |

*Primary Examiner*—Andrew L. Sniezek
*Assistant Examiner*—Larry T. Cullen
*Attorney, Agent, or Firm*—Leo J. Young, Esq.

[57] ABSTRACT

A disk drive for operating in an environment in which the drive is subject to physical shock includes a circuit which senses movement of a transducer head support arm which result from a shock's rotational component. The rotational shock is detected as a residual BEMF signal in the drive's VCM coil winding. The residual signal is extracted from much larger position control signals that are applied to the VCM winding during normal system operation by providing circuits that simulate the VCM winding voltage caused by the position control signal and subtracting the outputs of the simulation circuits from the actual VCM coil winding voltage. This eliminates the normal operating components and leaves a residual signal that represents only the small portion of the VCM BEMF signal that results from the rotational shock. A threshold circuit compares the shock BEMF signal to a predetermined threshold. If the BEMF signal exceeds the threshold, disk drive write operations are aborted. An active calibration system is also employed that regularly updates both the simulated resistance and simulated inductance to null out the effects of temperature, design and aging tolerances.

16 Claims, 9 Drawing Sheets

HARD DISK DRIVE WHICH USES THE BACK EMF OF THE ACTUATOR TO DETECT SHOCKS

BACKGROUND OF THE INVENTION

1. Field of the Invention

In general, this invention relates to hard disk drives. More particularly, it relates to a drive having a system that controls operation of the drive upon detecting that an off-track condition has been caused by a physical shock.

2. Description of the Related Art

Increasingly strict standards have been developing for judging whether a magnetic hard disk drive performs acceptably in an environment entailing physical shocks. A major impetus for such stricter standards is the increasingly hostile environment in which such a drive is used. The environment to which such a drive in a personal computer ("PC") is subjected is generally far less controlled than that for a drive for a mainframe or minicomputer. A drive in a PC (whether a desktop, laptop, or smaller PC) can be operating when it is subjected to physical shock resulting for example from a person bumping into the computer or dropping something on it.

An off-track condition is characterized by a head being displaced radially from the centerline of a track a sufficient distance so as not to be able to read or write reliably with respect to the track. Such an off-track condition can be caused by a physical shock. A shock-caused off-track condition is somewhat of a problem when it occurs during a read operation, because it can prevent the head from reading data from the selected track. Because drives ordinarily employ error detecting codes, such a problem during a read operation generally involves only the delay associated with retry operations. A shock-caused off-track condition is a significant problem when it occurs during a write operation. If the off-tracking displacement involves a whole track shift, the data being written can replace needed data whereby the replaced data can no longer be retrieved from the disk.

The difficulty involved in solving the basic problems associated with shock-caused off-track conditions has increased because of the trend to increase the number of tracks per inch ("TPI"). A drive that has a large number of tracks per inch has a small radial distance between concentric tracks. Furthermore, because of the need to provide very short seek times, such a drive is designed so that the actuator assembly that supports the head has a very low moment of inertia. In other words, a head moved by shock need not travel very far to fly above the wrong track, and it can be so moved there very quickly.

A suitable actuator assembly for a state-of-the-art drive for a PC includes a voice coil motor ("VCM") and certain head-supporting elements. Such a drive also includes other elements that cooperate with the actuator assembly to define a servo system. The servo system causes the actuator assembly to move the head to fly above the desired track during track-seeking operations and to remain flying above the desired track during track-following operations. Such a servo system can include a dedicated servo surface and associated dedicated servo head; however, a dedicated servo system is generally not cost effective for drives that have at most two disks such as the small form-factor drives that are mass produced for the PC market. A more cost-effective approach involves a sampled data servo system often referred to as an "embedded" servo system. As explained more fully below, an embedded servo system, albeit generally advantageous, has characteristics that exacerbate the problem of preventing shock-caused off-track writing.

In a drive having an embedded servo system, each recording surface of each disk has arcuate locations termed "servo sectors" that are reserved for servo burst fields and that are not used for storing user data. During time spaced-apart intervals in which a servo burst field is being read, the servo system has access to the information needed to determine whether a positioning error exists. If such positioning error exists, the servo system effects an appropriate adjustment to cause the actuator assembly to move to reduce the positioning error.

User data is recorded in the arcuate locations extending between adjacent servo burst fields in track portions termed "data sectors". This user data includes sector identification information written in sector ID fields and also includes data generated by application programs. Sector IDs are read and verified to insure the head is reading or writing the correct sector. When the head is over an incorrect track, a sector ID error will cause a read or write operation to abort. If a shock causes the head to move off track during the time between the reading of servo burst fields, no indication thereof is provided to the servo system during such time. The movement from a desired track to an incorrect track can also occur after the head reads sector ID data indicating that the head is above the desired track. Thus, while a write operation is occurring, neither the servo system nor an incorrect sector ID can prevent a shock from causing a write operation on the wrong track.

A prior art approach to protecting data from the effects of such a shock is disclosed in U.S. Pat. No. 4,862,298. This approach involves the use in the disk drive of a tri-axial sensor and circuitry responsive thereto to produce three signals each representative of the magnitude of the shock acting along a respective one of three orthogonal lines. If any of the three signals exceeds a threshold amount (a "write-fault threshold"), writing by the drive can be turned off.

Such a tri-axial sensor, each of whose output signals represents only a linear component of the shock-caused motion along a respective one of three orthogonal lines, does not adequately provide for determining the rotational component of shock-caused motion. More generally, any signal produced by any similar sensor, which signal represents only a component of the shock-caused motion acting along a single line, does not provide a sufficient basis for determining the rotational component of the shock-caused motion. Unless such rotational component is determined, it is difficult if not impossible to set a write-fault threshold that consistently works properly. If a shock causes a linear acceleration along a line in a plane parallel to the disks and substantially spaced from the center of mass, a substantial angular acceleration can be produced by a relatively low level linear acceleration. In other words, the write-fault threshold set for linear acceleration would not be exceeded in situations in which it would be desirable for it to do so. On the other hand, a shock can cause a linear acceleration along a line in a plane parallel to the disks and through or close to the center of mass. In such cases, relatively little angular acceleration can be produced by a rather substantial linear acceleration. In this case, the linear acceleration may be sufficient to exceed the write-fault threshold and thereby result in a "false alarm," and writing of data is inhibited when it is not desirable to do so. Such "false alarms" cause "hesitations" during data write operations with a consequent degradation in the drive's write time performance parameters.

Additionally, using such a tri-axial sensor in a modern compact form factor disk drive involves placing an additional mechanical component inside a housing designed to minimize internal volume. Space must be provided to accommodate such a sensor in addition to the conventional mechanical and electromechanical components contained within a drive housing.

Accordingly, there is a need for a system which can provide a sufficient basis for determining the rotational component of a shock-caused motion and which can prevent a write operation from being carried out during an off-track condition. Such a system preferably minimizes "false alarms." Also, such a system preferably requires minimal, if any, additional space within a disk drive housing.

SUMMARY OF THE INVENTION

The present invention is embodied in a hard disk drive for operating in an environment in which the drive is subjected to physical shock. The drive comprises a transducer head and channel circuit means for processing write and read signals provided to and received from the head. The drive further includes a rotating magnetic storage disk and rotatable actuator means. The disk has a recording surface containing concentric tracks having data sectors and embedded servo sectors. The rotatable actuator means includes means for supporting the head adjacent the recording surface and a voice coil motor for moving the head across the recording surface. The voice coil motor includes a coil winding. The drive further includes sampled-data servo means for controlling the position of the head during head positioning operations including track-following operations. The servo means includes actuator driver circuit means for applying a position control signal to the coil winding. The coil winding produces a winding voltage a first variable portion of which is induced by physical shock and a second variable portion of which is caused by the position control signal. The drive further includes signal processing means responsive to the winding voltage for producing an analog signal representative of the shock-induced portion of the coil voltage. The drive further includes circuit means responsive to the analog signal for producing a digital signal indicating that an off-track condition has been caused by a physical shock. The drive further includes means operative responsive to the digital signal for controlling the channel circuit means during track-following operations.

In a preferred embodiment of a hard disk drive in accord with this invention, the drive is extremely compact so as to be especially useful in a laptop or notebook computer. The compact drive has a single disk providing two recording surfaces. The drive has a head stack assembly which includes two heads and circuitry forming part of the channel circuit means. The sampled data servo means in the preferred embodiment includes a microcontroller that executes instructions stored in the drive, including instructions organized to provide control over the operation of the signal processing means.

Viewed from another aspect, the invention is embodied in an integrated circuit for processing a shock-induced signal contained in a winding voltage developed across a coil winding of a rotary voice coil motor. The integrated circuit comprises first input means for receiving the winding voltage, and second input means for receiving simulation signals. The integrated circuit further includes circuit means, including algebraic summing circuit means, for processing the winding voltage and the simulation signals to produce an extracted signal representative of the shock-induced signal. The integrated circuit further includes threshold circuit means responsive to the extracted signal for producing a digital signal indicating that the shock-induced signal has exceeded a predetermined threshold.

DETAILED DESCRIPTION OF THE INVENTION

Figure 1:
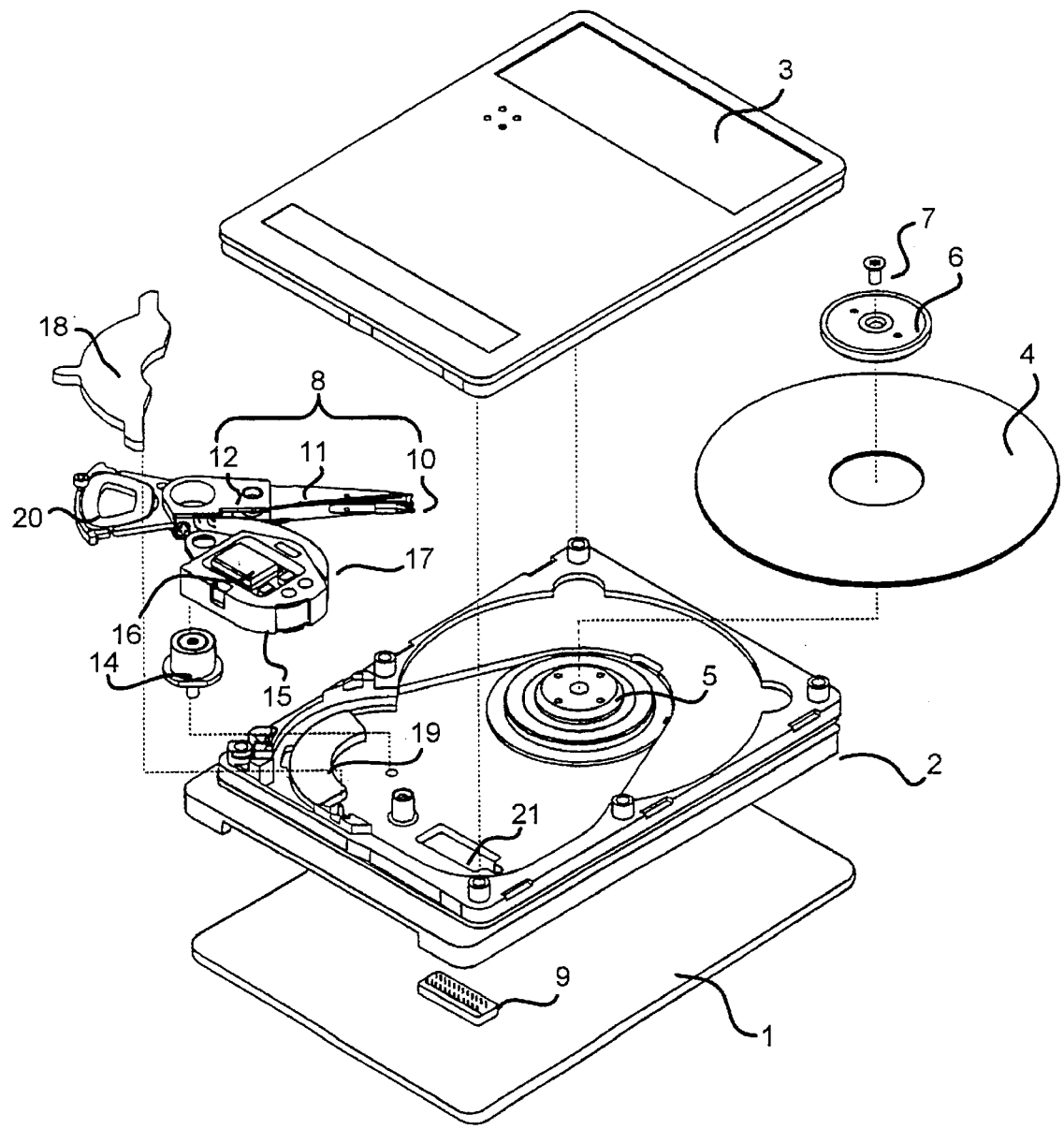
FIG. 1 is an exploded view of a hard disk drive embodying the present invention.

In FIG. 1, a hard disk drive embodying the present invention is shown in exploded view. A printed circuit board assembly ("PCBA") 1 includes numerous electronic components described in detail below with reference to other drawings such as FIG. 3. A base 2 attaches to the PCBA by a screw (not shown). A cover 3 attaches to base 2 by friction fittings (not shown). Base 2 and cover 3 and a conventional tape seal (not shown) provide for forming an enclosure. A single magnetic data storage disk 4 is provided. Disk 4 has upper and lower recording surfaces. The dimensions of the assembled housing and PCBA are approximately 0.40 inches high by 2.75 inches long and 1.8 inches wide. The present invention may be embodied in disk drives having more disks and other form factors.

A spindle motor 5 is mounted to base 2. A disk clamp 6 and a single mounting screw 7 provide for mounting disk 4 to spindle motor 5. Preferably, spindle motor 5 is a commercially available brushless three phase motor. In operation, spindle motor 5 rotates disk 4 at a substantially constant angular velocity; in the illustrated embodiment approximately 4500 R.P.M.

An electrical connector 9 is provided on PCBA 1. Some of the electronic components on PCBA 1 (which are described in detail below with reference to other drawings such as FIG. 3) are electrically connected by connector 9 to electronic components within the enclosure.

A rotatable actuator assembly is provided in the disk drive for transferring data to and from disk 4. Rotatable actuator assembly includes a head stack assembly 8 suitably comprising at least one read/write transducer head 10, at least one load beam 11 that supports head 10 as it flies in conventional manner adjacent the recording surface of disk 4 and an E-block 12. Load beam 11 is mounted to extend outwardly from one end of E-block 12 which is itself mounted to rotate about a pivot bearing 14 which defines an axis of rotation for the actuator assembly. Transducer head 10 is mounted to load beam 11 at the end opposite the E-block. Head 10 flies over the recording surface of a disk in conventional "Winchester" fashion in the illustrated embodiment. However, those skilled in the art will recognize that heads in physical contact with the disk surface, such as "contact" heads or "tail draggers" may be used with equal effect.

The rotatable actuator assembly also includes a "voice coil" actuator motor which includes a voice coil winding 20 mounted to extend outward from E-block 12 at the end opposite the load beam. A permanent magnet 19, mounted on base 2, and a flux return plate 18 are provided below and above, respectively, voice coil winding 20 and cooperate with it to form a voice coil motor. Voice coil winding 20 is supported so as to be freely rotatable through an arcuate range corresponding to the desired arcuate movement of the head across the recording surface of the disk. Rotational motion of the actuator assembly is effected by application of an appropriate electrical current to voice coil winding 20. A suitable voice coil motor may be such as described in U.S. Pat. No. 5,270,887, issued Dec. 14, 1993 and commonly owned by the assignee of the present invention, the subject matter of which is expressly incorporated herein by reference. The actuator assembly, including the head stack 8 and voice coil winding 20, is counter-balanced. The actuator assembly is constructed to have its center of mass at the center of rotation of pivot bearing 14.

A flex circuit assembly 15 is positioned adjacent the actuator assembly. Flex circuit assembly 15 includes an integrated circuit 16 which includes a read/write preamplifier for initially amplifying low level read signals and for providing a write current to the read/write head. Circuit 16 also includes a head multiplexer which selects or determines which head is being used at any one time to either write or read data. The heads are multiplexed due to the higher cost and complexity associated with maintaining dedicated preamplifier channels for each head. Read/write preamplifiers are well known in the art and can be implemented in a variety of ways. For example, a commercially available integrated circuit manufactured and sold by Silicon Systems Inc. of Tustin, Calif. under a manufacturer's part number SSI 2020 incorporates such a preamplifier circuit.

Flex circuit assembly 15 includes a flex cable 17 having conductive leads encased in a flexible, plastic material. Flex cable 17 is attached to E-block 12 and connected to conductors leading down load beam 11 to head 10. The flex cable 17 and load beam conductors form an electrical conduction path between the read/write head 10 and the preamplifier 16. Electrical connection is also made between the flex cable 17 and the ends of voice coil winding 20. Electrical drive current is provided the coil winding through conductors comprising flex cable 17.

Electrical connection of the flex circuit assembly 15 to the printed circuit board is made through a gasketed opening 21 provided in the base to an electrical connector 9 on the circuit board 1. Electrical contact is made when the connector is inserted through the gasketed opening as the circuit board is mated to the housing during the assembly process.

Figure 2:
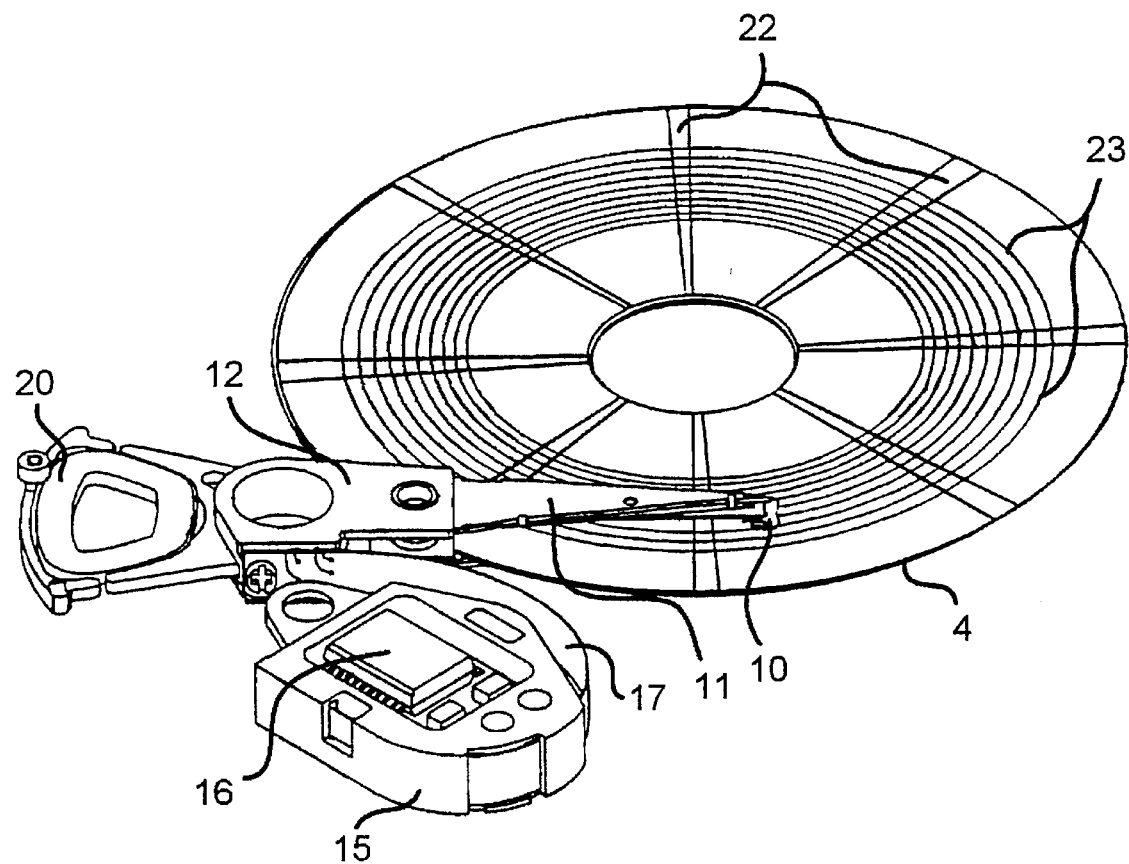
FIG. 2 is a perspective view of certain components of the drive shown in FIG. 1, including a magnetic data storage disk and an actuator assembly, with servo and data sector placement on a surface of the disk being diagrammatically illustrated.

Referring to FIG. 2, each of the upper and lower surfaces of disk 4 comprises a plurality of concentric, radially spaced-apart data tracks. Each surface further comprises a plurality of servo sectors 22, which are generally wedge-shaped areas that are reserved for servo information, and data sectors 23, which are areas between consecutive servo sectors into which user data may be stored (written) or from which previously stored data may be read. In the illustrated embodiment, disk 4 contains 850 such data tracks on each of the two major surfaces, with an approximate track density, on each surface, of 2500 tracks per inch ("TPI").

Each surface of disk 4 includes approximately fifty spaced-apart servo sectors 22 (eight only are shown in FIG. 2 for clarity). During a normal track following operation, servo sectors pass beneath the head during time spaced-apart intervals in which servo information is read. The servo information is then used by conventional disk drive servo control circuitry to determine whether a head position error, relative to the center of a data track, exists. If so, the voice coil motor (VCM) repositions the head appropriately.

The spaced-apart prerecorded servo sectors and signal processing circuitry define, in combination, a head positioning servo system of the embedded type in which the prerecorded servo sectors move under an active read/write head to cause production of a servo signal during pre-set timing intervals which is used by the signal processing circuitry to adaptively command the positioning of the read/write head to a track centerline.

In operation, a servo sector passes beneath head 10 approximately every 267 microseconds. Servo loop dynamics are chosen by design such that, during normal operation, an active transducer head will not move more than ±10% of the track width from the centerline between servo sectors. This value is chosen because a larger displacement will result in degrading adjacent track data. Track pitch for disk 4 is approximately 400 microinches, giving a maximum allowable displacement of the transducer head of about 40 microinches from the centerline before adjacent track data is degraded.

If a head position error is determined by the servo control circuitry, an appropriate amount of current is applied to the voice coil winding (20 in FIG. 1), generating a torque which rotates the actuator assembly about its pivot bearing (14 in FIG. 1) and arcuately repositions the transducer head over the centerline of the data track. User data may then be reliably read from or written to the data sectors 23. If, however, a rotational shock is applied to the disk drive such that the transducer head is displaced from the track centerline by more than ±10% of the track pitch before the next servo sector passes beneath the active transducer head, corruption of adjacent track data can occur before a head position error can be determined and corrected. This condition obtains when the head is moved with a velocity of greater than 0.15 inches per second (more than 40 microinches in less than 267 microseconds).

However, a rotational shock event which moves a read/write head to an adjacent track will also cause the voice coil winding to move through the magnetic field set up by the permanent magnet of the VCM. As is well known in the art, movement of a conductive coil through a magnetic field generates a voltage in the coil. This voltage is known as a Back Electromotive Force or BEMF.

The invention provides a system and method to sense the BEMF produced by such rotational shocks, and can be used to inhibit the writing of data onto the disk when such a shock has occurred before the head has moved appreciably into an adjacent track; reading data out from the disk can also be inhibited if desired.

When an external shock is applied to the illustrated disk drive for about 1–5 milliseconds, causing a displacement of the read/write head by about 40 microinches (1/10 of a standard data track width), then a BEMF voltage of about 0.5 millivolts is induced in the VCM winding. Such external shocks typically result from placing an operating laptop type computer on a desk or table and allowing a corner to drop from a height of as little as 15 millimeters. According to the invention, such shocks are detected by sensing the resultant BEMF produced in the VCM coil winding.

However, a voltage on the order of 0.5 millivolts tends to be swamped by the much higher normal operating voltage levels encountered in the VCM coil winding. During normal track following operations, the actuator is commanded to move by means of a current provided to the voice coil. Once on track, these drive currents produce voltages on the order of 150 millivolts peak-to-peak across the voice coil winding 20. The read/write heads are typically dithered back and forth by about 2 to 3 percent of the data track width to hold the read/write head in alignment over the desired data track centerline. This 150 millivolt track following voltage component makes it very difficult to reliably detect the component of the VCM voltage signal that can be attributed to a rotational shock. The invention provides a way to reliably extract the shock BEMF component from the VCM coil winding signal, and to use it to detect the occurrence of a rotational shock.

Figure 3:
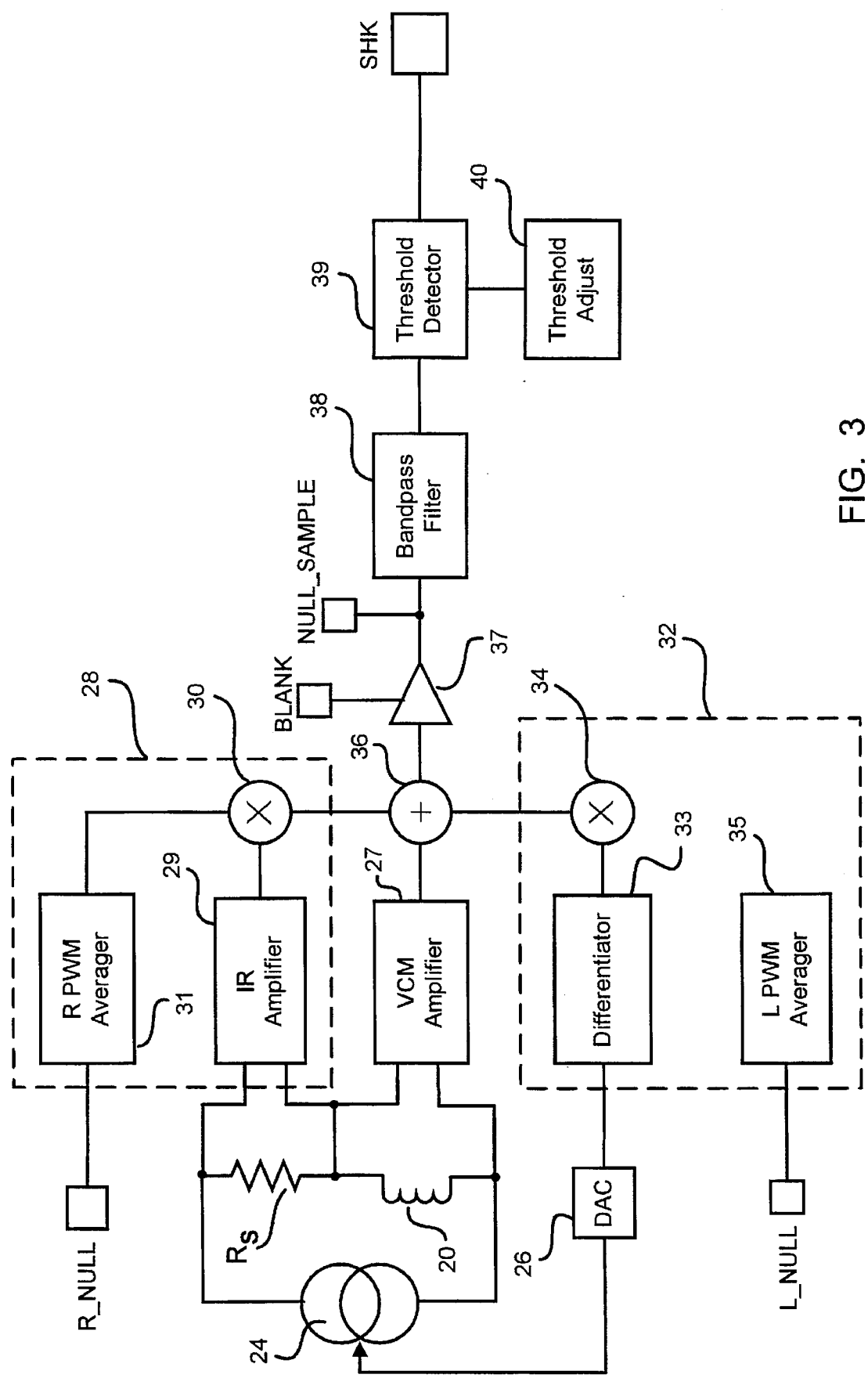
FIG. 3 is a block diagram of a system which is included in the drive shown in FIG. 1 and which is provided for inhibiting writing to the disk when the drive has received a shock that causes an off-track condition.

A block diagram showing a preferred implementation of a back electromotive force (BEMF) sensing rotational shock detection system is depicted in FIG. 3. The system includes a VCM voice coil winding 20 and VCM driver circuit means 24 (represented as a current source) connected to the coil winding so as to apply an electrical current to the coil winding through a sense resistor Rs. A digital-to-analog converter (DAC) 26 operating under control of a microcontroller (not shown) provides motion control signals to the VCM driver circuit in conventional fashion. A suitable VCM driver circuit 24 is typically included in a commercially available motor driver product such as the UC3173 Actuator Driver integrated circuit made and sold by Unitrode.

A VCM amplifier 27 is constructed as a differential amplifier configured for unity gain and high common mode rejection and is connected across VCM winding 20 to extract voltages developed differentially across the VCM winding. Voltages developed across the VCM coil winding typically include three components: a resistive component (IR) which is a product of the current intentionally provided to the coil winding by the driver, times the drop of the coil's intrinsic resistance; an inductance component (L di/dt) which is a transient voltage produced by the coil's intrinsic inductance; and a BEMF component. However, the voltages developed across the coil winding are differential voltages riding on large common mode voltages generated by driver circuit 24. The differential voltages developed across the VCM coil winding 20 are extracted by means of VCM amplifier 27 to produce an output that represents both the IR and L di/dt components of normal, commanded, actuator movement and the BEMF component of rotational shock induced movement. In order to resolve the BEMF component from the total VCM voltage, the resistive and inductive components are determined and removed.

Means are provided, in the shock detection system, to compensate for the resistive (IR) and inductive (Ldi/dt) components of the VCM voltage. An IR (resistance) simulator 28 includes an IR amplifier 29, a variable gain element 30 and an averager 31 which, in combination provides means for simulating the resistive component of the coil winding's normal operating signal.

IR amplifier 29 is constructed as a differential amplifier, configured for unity gain and high common mode rejection and is connected to extract voltages appearing differentially across the sense resistor Rs. The voltage extracted by IR amplifier 29 is proportional to the IR component of the VCM voltage by the ratio of Rs to the VCM coil winding resistance as the VCM drive current passes serially through them both. This ratio may be predetermined by resistance measurement of the VCM winding and by a suitable component choice of Rs.

Reliance on a fixed ratio of Rs to the winding resistance, to simulate the winding's IR component, does not allow for error in the ratio tolerancing. Since the VCM coil winding is typically copper, and operation is typically desired through a 50 degree Centigrade commercial range, temperature-induced variations in resistance values in excess of 10% can be expected. In addition, the VCM winding's resistance can vary by approximately another 10% due to manufacturing tolerances. To accommodate initial resistance variations and compensate for temperature induced resistance variations, the output voltage of IR amplifier 29 is gain controlled by a gain element 30.

Gain element 30 is a conventional variable gain amplifier (VGA) that adjusts the output signal from IR amplifier 29 to maintain the chosen resistance ratio across variations in the winding. The amount of gain provided by VGA 30 is set by a gain control element, R-PWM averager 31, such that the output voltage of the VGA maintains a −1 unity gain ratio with the resistance component of the winding.

In a similar fashion, the inductance (Ldi/dt) component of the VCM voltage is compensated for by inductance simulator 32. Inductance simulator 32 includes a differentiator 33 connected to DAC 26 to also receive the motion control signals provided to the VCM driver circuit 24. Differentiation of the motion control signals provided by the DAC results in a differentiator output signal closely simulating the transient voltage characteristic of the coil winding's L di/dt component. Since a particular winding's L di/dt response curve can be accurately determined by characterization and measurement, a differentiator circuit can be constructed, by one skilled in the art, that accurately reproduces the curve by a suitable choice of components. As described more fully below, a trade-off exists between the degree of reproduction accuracy and differentiator circuit complexity.

A winding's inductance also varies with production tolerance and aging. In order to maintain the differentiator's simulation accuracy, the output of differentiator 33 is gain adjusted by a second gain element 34. Gain element 34 is a second variable gain amplifier (VGA) with gain variably determined by a second gain control element, L-PWM averager 35. L-PWM averager 35 provides a gain control signal to VGA 34 such that the output voltage of VGA 34 maintains a −1 unity gain ratio with the inductance component of the winding.

Rotational shock induced BEMF voltages are extracted from the composite VCM voltage signal by summing amplifier 36. Composite VCM voltage signals, provided by VCM amplifier 27, are combined by the summing amplifier 36 in negative fashion with the output signals from the IR simulator 28 and the L di/dt simulator 32. This causes the normal operational IR and L di/dt components of the VCM composite voltage to cancel, yielding a residual signal that represents only the BEMF contribution to the coil winding signal.

Accurate gain control of the VGAs is important to the simulators' ability to maintain a −1 unity gain ratio of their simulated components to the resistance and inductance components of the composite VCM voltage. Accurate simulation allows the shock detection system to successfully extract a shock BEMF signal from a much larger normal operating signal. Gain control is accomplished by the R-PWM averager 31 and L di/dt averager 35 operating in combination with an external microcontroller (not shown). The VGAs 30 and 34 are actively gain adjusted by the averager circuits, 31 and 35 respectively, during normal operation to maintain a zero AC output from the summing amplifier 36 (the summing amplifier output will normally ride on a DC reference voltage).

As described in detail in connection with FIG. 4, the output from the summing amplifier 36 is sampled on a regular basis by the microcontroller at an output terminal (NULL_SAMPLE). A computational calibration is performed and the averager's gain control signals to the VGAs adjusted as necessary to null (zero) the summing amplifier. In the illustrated embodiment, the microcontroller provides nulling signals R_NULL and L_NULL to the respective averagers 31 and 35 by means of internal pulse-width-modulators (PWM). R-PWM and L-PWM averagers 31 and 35 are constructed to average the PWM signals, supplied by the microcontroller, from width modulated pulses to magnitude signals suitable for use by the VGAs.

The differentiator circuit 33 is designed to accurately reproduce the low frequency L di/dt signal produced by the winding, however, it does not fully simulate a high frequency spike that occurs at the beginning of each change in the drive signal for the VCM winding. Such a change in the drive signal normally occurs during a servo sample period and represents a head repositioning update signal sent to the VCM as a result of any off-track indication by the servo system. These high frequency spikes can pass through the summing amplifier 36 without being adequately compensated, and be mistaken for a residual shock BEMF signal. To eliminate this possibility, a blanking circuit, including a signal blanking gate 37 and a control terminal, connected to an external microcontroller, is provided at the output of the summing amplifier 36. The microcontroller issues a control signal BLANK, in synchronous fashion with a servo system, that causes the blanking gate 37 to block the transmission of signals from the summing amplifier during a portion of a servo sample period (during times at which a high frequency spike may be present).

Drive circuit updates are typically provided by the DAC at servo sector intervals which occur, in the illustrated embodiment, on the order of every 267 microseconds, and a blanking period of approximately 50 microseconds is employed at the beginning of each update to block the high frequency spike.

Residual electronic error components such as ground noise, amplifier noise and DC offsets may be present in the summing amplifier's output signal. An RC band pass filter 38 is provided to remove these components by attenuating all but the signals representing a BEMF component of a shock pulse. Typical shock pulses will have durations (half-cycles) of about 1–5 milliseconds, which corresponds to a frequency range of about 100–500 Hz. The band pass filter 38 is configured to pass frequencies within this range but attenuate other frequencies.

A threshold detector 39 compares the magnitude of the residual BEMF signal, resolved through the band pass filter 38, with a threshold signal value determined by a threshold adjust circuit 40. Since the residual shock signal can be either positive or negative, depending upon the direction in which the actuator assembly was rotated, a symmetrical dual polarity detector is used. Should the magnitude of the residual BEMF signal exceed the threshold level (typically 20 millivolts in the illustrated embodiment), a rotational shock event is deemed to have occurred and an output signal (SHK) is produced at an output terminal of the shock detection circuit. SHK acts to cause an unanticipated assertion of a write unsafe condition (WUSF) which is received by conventional disk drive controller circuitry which then aborts any write operation in progress.

Figure 4:
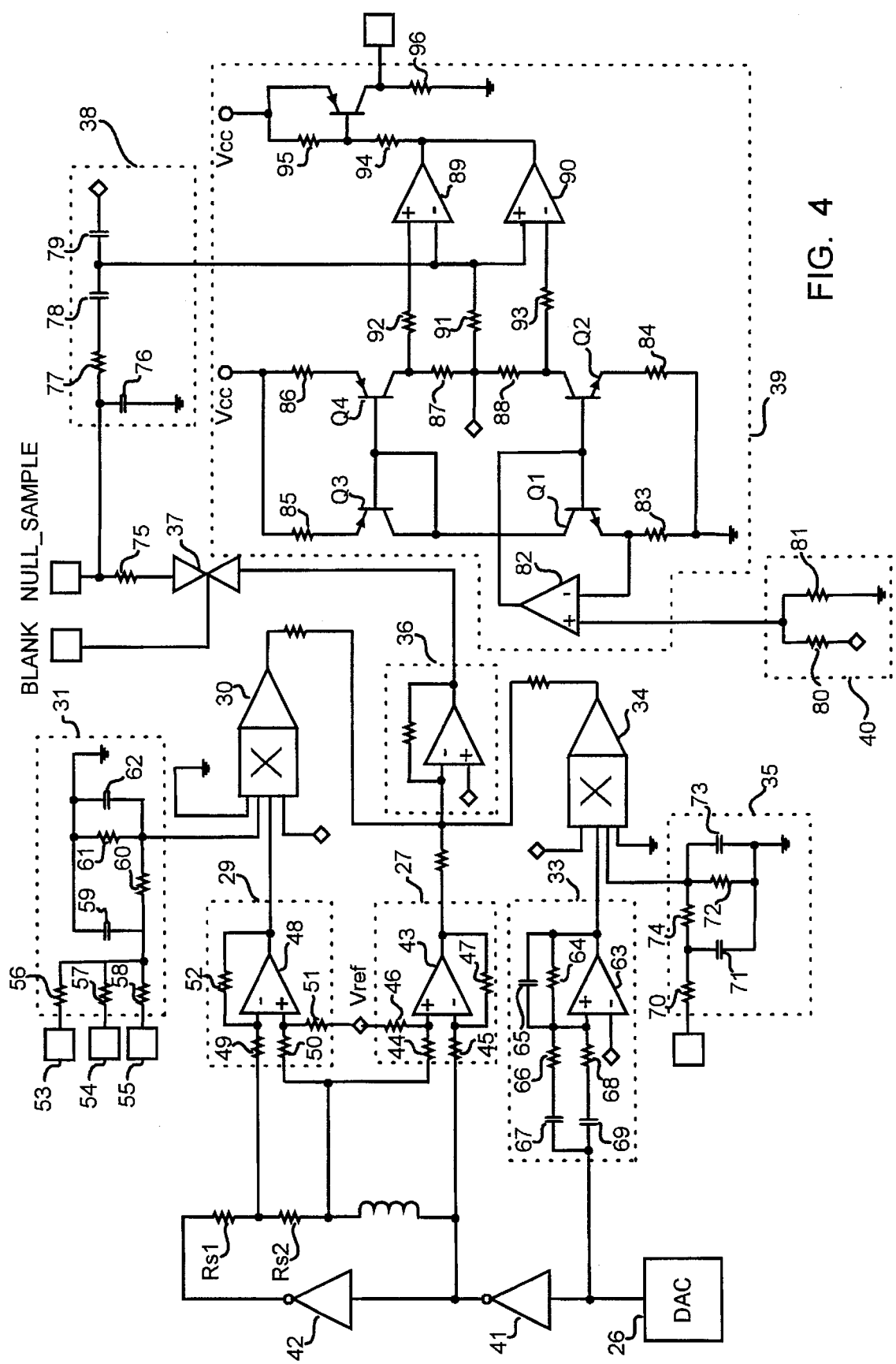
FIG. 4 is a block and schematic diagram showing suitable circuitry for implementing the system depicted in the block diagram of FIG. 3.

FIG. 4 is a block and schematic diagram showing suitable circuitry for implementing the BEMF sensing shock detection system depicted in FIG. 3. In this figure the functional block diagram elements of FIG. 3 are enclosed within dashed lines, and labeled with the same reference numbers. Circuitry depicted in FIG. 4 may be implemented as a single chip integrated circuit included on the printed circuit board of a disk drive (1 of FIG. 1).

The drive circuit for the VCM winding is implemented in a conventional manner as an amplifier circuit consisting of inverting operational amplifiers (op-amps) 41 and 42, with the output of 41 connected to the input of 42 and one side of the VCM coil winding 20. The output of op-amp 42 connected to one side of the sense resistor, the other side of which is connected in series fashion to the coil winding. The drive circuit receives analog input signals from a digital-to-analog converter (DAC) 50. In a manner to be describes below, DAC 26 conventionally receives digital signals representing a desired amount of head repositioning from an external microcontroller, operating in conjunction with a servo system to keep the read/write head in alignment with the desired data track. The drive circuit op-amps 41 and 42 operate around a voltage reference level of typically 2.15 volts, with one amplifier above the voltage reference and the other below, depending upon the signal polarity.

The sense resistor is divided into two resistance elements Rs1 and Rs2 for convenience; a total 10 ohms sense resistance is used for the normal current drive to the VCM winding, while a sense resistor of only about 5 ohms is more compatible with the preferred shock detection circuitry. Thus, both Rs1 and Rs2 are included in the drive circuit for the VCM winding, whereas only Rs2 is used for the shock detection.

VCM amplifier 27, is constructed with a unity gain differential amplifier 43, configured for high common mode rejection, connected to extract the voltage appearing differentially across the VCM winding 20 through resistors 44 and 45; this voltage represents both the normal operating signal across the VCM winding, and the influence of any shock BEMF. The amplifier's non-inverting input (+) is connected to a reference voltage Vref through a resistor 46, while its output is connected back to its inverting input (−) via a feedback resistor 47. In the illustrated embodiment of FIG. 4, all connections to the reference voltage Vref are represented by an open diamond symbol. Where an open diamond appears in FIG. 4, that point will be taken to represent a connection to Vref.

The voltage at the output of the VCM amplifier 27 is the sum of the voltages developed differentially across the VCM coil winding 20. This voltage typically has three components; a resistive component representing the IR drop across the coil due to a drive current, an inductive component (L di/dt) representing the voltage drop due to the coil inductance and a voltage due to the effects of any BEMF component present. In order to extract the BEMF component, the resistive (IR) component and the inductive (L di/dt) component must be removed.

The resistance simulator that simulates voltage drop across the VCM winding resistance (IR) includes an IR amplifier 29 constructed with an operational amplifier 48, configured for unity gain, whose inputs are connected across the sense resistor Rs2 through resistors 49 and 50. The IR amplifier 29 has a similar construction to the VCM amplifier 27, with resistors 49 and 50 being equal in value to resistors 44 and 45; voltage reference and feedback resistors 51 and 52, respectively, having values equal to the comparable resistors 46 and 47 in the VCM amplifier circuit. Since Rs2 is connected in series with VCM coil 20, any drive current provided the coil will also set up a corresponding IR drop across Rs2. The resistance simulation circuit thus produces an output voltage at the output terminal of the unity gain op-amp 48 that simulates the resistive component included in the output voltage of the VCM amplifier 27.

The output of the IR amplifier 29 is applied as one input to a conventional four input variable gain amplifier (VGA) 30, configured to have a gain of 8, ±25% for a 0 to 2 volt control range. The resistance value of the VCM coil 20 is approximately 8 times that of the 5 ohm sense resistor Rs2. VGA 30 is constructed to have a gain of approximately 8 in order to compensate for the ratio of coil to sense resistances and maintain a −1 unity gain ratio at the summing amplifier 36 with the resistance component of the VCM amplifier signal. Ground and reference voltage potentials are also provided as inputs to the VGA 30. The gain control input is taken from an output of a gain control element, R-PWM averaging circuit 31. Inputs to the VGA 30 are arranged such that the output from the R-PWM averager 31 and ground potential comprise a first differential pair, while the output from the IR amplifier 29 and the reference potential Vref comprise a second differential pair.

A gain control element, R-PWM averager 31, produces a signal which controls the variable gain of VGA 30. Controlled variations in VGA gain allows for compensation of temperature induced variations in the VCM coil winding's resistance values. In a manner described further below, a change in the coil winding's resistance is periodically determined by a microcontroller which then computes and generates a corresponding compensation signal and applies the compensation signal to the R-PWM averager on a set of control inputs. The R-PWM averager, in effect, translates the microcontroller generated compensation signal into a gain control signal adapted to vary the gain of the VGA.

Compensation signals are provided to R-PWM averager 31 over three control input terminals 53, 54 and 55, connected in series fashion to respective input resistors 56, 57, and 58, the resistors having their other ends connected in common. Compensation signals, received by the control inputs, are filtered through an RC circuit comprising a capacitor 59 connected between ground and the input resistor's common node, and a resistor 60 connected in series fashion between the input resistor's common node and a parallel resistor (61) and capacitor (62) combination to ground. The RC circuit functions to average the compensation signals and provides an analog gain control signal to the VGA 30 from the junction between resistor 60 and the parallel resistor/capacitor (61/62) combination. The double section RC circuit also provides a faster settling time after a demand change without increasing ripple.

Resistors 60 and 61 function as a voltage divider with resistance values chosen to provide a voltage multiplication factor of about 0.4. In the illustrated embodiment, a microcontroller PWM is connected to input terminal 55, to which it provides an signal (identified as R_NULL) having a range of from 0 to 5 volts. Input terminals 53 and 54 are connected to high speed port outputs of the microcontroller which ports are commanded to have a value of either a zero or a 5 volt one. Resistors 56 and 57 are connected to act in a manner similar to an R-2-R ladder. Resistance values selected for resistors 56 and 57 are preferably not exactly in an R-2-R ratio, so that an overlap can be obtained between the signal ranges for the various resistors, with 56 and 57 adding approximately an extra bit each. In the illustrated embodiment, resistor 58 has a value of 909K Ohms. Resistor 57 has a value of 1M Ohm; resistor 56 has a value of 499K Ohms. If both terminals 53 and 54 are grounded (the high speed ports on the microcontroller commanded low), the input resistor ladder network, in combination with the voltage divider resistors 60 and 61 will convert a 0 to 5 volt PWM input range to a 0 to 0.5 volt swing at the input of the VGA 30.

Likewise, were the port connected to terminal 54 commanded high (5 volts) and terminal 53 held low, the 5 volt PWM range converts to a 0.5 to 1.0 volt range at the VGA. A 1.0 to 1.5 volt VGA swing may obtained by grounding terminal 54 and putting terminal 53 high, while a 1.5 to 2.0 volt range is obtained by placing both 53 and 54 high. Use of an input ladder allows a substantial increase of input signal resolution over that obtainable from a PWM alone.

An averaging circuit, such as R-PWM averager 31, is included in the embodiment to average a time dependant signal such as from a PWM. Were the resistance compensation signals provided by, for example, a digital-to-analog convertor (DAC), they could be fed directly to the corresponding input of VGA 30 without the need for the RC network of an averager.

Turning now to simulation of the VCM winding's inductance, the preferred embodiment avoids the use of inductor elements because of the difficulty in monolithically integrating them with other circuity. Instead of applying a current step to an inductance circuit, the VCM winding inductance is simulated by applying a voltage step to a capacitive circuit. The voltage step is taken from the output of the DAC 26, and thus is referenced to the signal applied across the VCM winding. However, the VCM inductance cannot be accurately simulated with a simple RC circuit, since the VCM inductance actually behaves like a distributed network. A preferred circuit includes a differentiator 33, constructed with an operational amplifier 63 whose non-inverting input is connected to Vref. A parallel RC circuit consisting of resistor 64 and capacitor 65 is connected between the output of the op-amp and its inverting input, while two series RC circuits (resistor 66/capacitor 67 and resistor 68/capacitor 69) are connected together in parallel fashion and connected in series between the inverting input and the DAC 26. The parallel and series networks are configured as a differentiation circuit which, in combination with operational amplifier 63 and the DAC 26 provides a differentiated and inverted version of the DAC signal provided to the VCM drive circuitry.

Since the L di/dt response characteristics of a VCM coil to a given DAC drive current can be accurately characterized during the disk drive manufacturing process, the configuration of, and component values for the differentiator circuit 33 may be arbitrarily chosen during the design process in order to closely simulate the characteristic shape of the L di/dt response of a given VCM coil winding.

The L-PWM averager 35 is similar in construction to the R-PWM averager 31, but does not require as much resolution in the input range and therefore has only a single control input and input resistor 70 to receive a PWM control signal (identified as L_NULL) from a microcontroller. PWM signal averaging is accomplished with an RC circuit that includes a capacitor 71, connected between input resistor 70 and ground, parallel connected resistor 72 and capacitor 73, the combination connected in series fashion between ground and a gain control input to gain element VGA 34, and a further resistor 74 connected between input resistor 70 and the resistor/capacitor (72/73) parallel combination.

The gain element 34 is a second conventional four input VGA having a gain of 5, ±25% for a 0 to 2 volt control range, having a first set of differential pair inputs connected to the output of the differentiator 33 and a reference potential Vref. A second set of differential pair inputs are connected to the L-PWM averager 35 and ground potential. The gain of VGA 34 is nominally set to 5 in order to compensate for the signal ratios of the coil and the DAC/differentiator combination and maintain a −1 unity gain ratio at the summing amplifier 36 with the inductance component of the VCM amplifier signal.

Summing amplifier 36 is a conventional operational amplifier configured to have a fixed gain in the range of 40 to 80 by suitable choice of components. Its inverting input is connected to a summing junction to which is also connected the outputs of the VCM amplifier 27 and the VGAs 30 and 34. VGA 30 provides a signal to the summing junction corresponding to the VCM coil's resistive (IR) drop when a drive current is provided and VGA 34 provides a signal corresponding to the VCM coil's inductive (L di/dt) drop when a drive current is provided. These signals are nulled (arithmetically added) to the signal from VCM amplifier 27 leaving only a BEMF component to be amplified by the summing amplifier 36. The gain of summing amplifier is set within a range of from 40 to 80 in order to amplify the typically ½ to 1 millivolt signals from the VCM amplifier to more useable levels. Since voltages due to intentional motion of the VCM coil are canceled, any residual voltage at the output of summing amplifier 36 will be due to rotary shock BEMF and any error terms present in the cancellation process.

A blanking gate 37 and resistor 75 are connected in series fashion between the output of the summing amplifier and a bandpass filter 38. The blanking gate 37 may be a simple transistor, but it is preferably implemented by a tristate operational amplifier whose input is connected to the output of the summing amplifier. A blanking signal, denoted as BLANK, is applied to a control terminal connected to the tristate amplifier during the transient high frequency spike that is produced when the DAC 26 changes to a new step level in response to a command to move the actuator. As stated above, this blanking period preferably lasts for about 50 microseconds. An additional output terminal is provided between the blanking gate and resistor combination and the bandpass filter so that the output of the summing amplifier 36 may be periodically sampled. The signal taken from this output terminal is denoted NULL_SAMPLE.

A bandpass filter 38 is connected to the output of blanking amplifier 36 through series resistor 75. It includes an input capacitor 76 connected to ground, a resistor 77 and capacitor 78 connected in series fashion between the filter input and an output to a threshold detector circuit 39. An additional capacitor 79 is connected between the filter output and Vref. The input capacitor 76 absorbs transient signals that are produced by the blanking gate amplifier turning on and off, while the remainder of the circuit functions to pass frequencies in the approximate band of 100–500 Hz.

A threshold voltage level for recognizing a shock signal is set by a resistive voltage divider circuit in a threshold adjust circuit 40, constructed of resistors 80 and 81 connected to Vref and ground respectively. A resistor ratio is used for this purpose because absolute resistance values in conventional integrated circuits are subject to significant manufacturing processing tolerances, whereas resistance ratios can be more precisely controlled. A desired threshold level, or a threshold adjustment can be implemented merely by trimming one or both resistors during the disk drive manufacturing process.

Once determined, the threshold level is provided to a threshold detector circuit 39 which compares the magnitude of any residual BEMF signal resolved by the summing amplifier to the threshold level. The midpoint of the threshold adjust resistors 80 and 81 is connected to the non-inverting input of a buffer amplifier 82. The output of this amplifier is connected to the bases of current source configured NPN bipolar transistors Q1 and Q2, providing a drive current to these transistors that sets their currents. The emitter of current source transistor Q1 is connected back to the inverting input of amplifier 82 and to one end of a resistor 83 the other end of which is connected to ground potential. Similarly, a matched resistor 84 is connected in series fashion between the emitter of Q2 and ground potential.

A diode connected PNP transistor Q3, having its base and collector tied to a common node, connected in turn to the collector of Q1, provides collector current to Q1. The emitter of Q3 is connected to a suitable supply potential (Vcc) through a bias resistor 85. The current through Q3 is mirrored in conventional fashion in PNP transistor Q4; the base of Q4 being connected to the base and collector of Q3 and the emitter of Q4 connected to Vcc through bias resistor 86.

In the illustrated embodiment, transistors Q1, Q2, Q3 and Q4 are designed to have equal betas. Likewise, resistors 83, 84, 85 and 86 are matched so as to have equal resistance values. The collector current of PNP transistor Q4 is, therefore, equal to the collector current of NPN transistor Q2 and the collector current of PNP transistor Q3 is equal to the collector current of NPN transistor Q1. The collectors of Q4 and Q2 are connected to a reference potential (Vref) through series resistors 87 and 88 respectively. Voltage drops across the resistors are likewise equal.

The threshold comparison function is performed by a pair of comparators 89 and 90. The output of the bandpass filter 38 is connected, respectively, to the reference potential (Vref) through a resistor 91, the inverting input of comparator 89 and the non-inverting input of comparator 90. The non-inverting input of comparator 89 and the inverting input of comparator 90 are taken differentially across resistors 87 and 88 through extraction resistors 92 and 93 respectively. Extraction resistors 92 and 93 are constructed having equal resistance values, while resistor 91 is constructed having a resistance value ½ that of either extraction resistor in order to minimize the voltage offset from bias current for the comparators. With equal values assigned to resistors 87 and 88 and the connection between the two resistors referenced to Vref, a symmetrical absolute value threshold is established. The voltage on the positive side of resistor 87 is offset above Vref by the same threshold amount that the voltage on the negative side of resistor 88 is offset below Vref.

It is a feature of the illustrated embodiment that if the threshold adjust resistor ratio changes by trimming resistors 80 or 81, a voltage change at the non-inverting input of the op-amp 82 will cause a change in the potential supplied to the base terminal of Q1 and Q2 and a consequent change in Q1's and Q2's collector currents. The current change is mirrored in Q3 and Q4, symmetrically changing the voltage drop across resistors 87 and 88, thereby changing the threshold reference from Vref symmetrically for the comparators 89 and 90.

The comparator outputs are tied together in a conventional wired-OR configuration to Vcc through series resistors 94 and 95. A connection between these last two resistors is tapped to provide a base control voltage for an output PNP bipolar transistor Q5, whose emitter is tied to Vcc and whose collector is connected to ground through an output resistor 96; the circuit's output, taken at an output terminal 100, is the voltage across the output resistor 96.

Comparator 89 is actuated and allows current to flow through resistors 94 and 95 when a BEMF signal, received through bandpass filter 38, exceeds Vref by the threshold amount. This current, in turn, biases Q5 into conduction to develop an output signal across the output resistor 96 indicating a rotational shock event. Similarly, comparator 90 initiates the production of an output shock signal when the signal from bandpass filter 38 at its non-inverting input falls more than the threshold amount below Vref. In the absence of a shock signal from bandpass filter 38 that differs from Vref by more than a positive or negative threshold amount, the output transistor Q5 is held nonconductive, and the output terminal 100 is accordingly grounded.

Specific values for the various circuit elements in FIG. 4 are given below, with resistance values given in ohms. These values illustrate a preferred embodiment only, and should not be taken as limiting. Numerous changes to the circuit values and circuit configuration can be made within the scope of the invention.

| RS1 | 5 | 66 | 49.9K | 92 | 65K |
|---|---|---|---|---|---|
| RS2 | 5 | 68 | 17.4K | 93 | 65K |
| 44 | 5K | 70 | 249K | 94 | 5K |
| 45 | 5K | 72 | 332K | 95 | 2.1K |
| 46 | 5K | 74 | 249K | 96 | 10K |
| 47 | 5K | 75 | 5.6K | | |
| 49 | 5K | 77 | 33.2K | 59 | 470pf |
| 50 | 5K | 80 | 681K | 62 | 470pf |
| 51 | 5K | 81 | 261K | 65 | 620pf |
| 52 | 5K | 83 | 50K | 67 | 300pf |
| 56 | 499K | 84 | 50K | 69 | 430pf |
| 57 | 1,000K | 85 | 50K | 71 | 470pf |
| 58 | 909K | 86 | 50K | 73 | 470pf |
| 60 | 249K | 87 | 1K | 76 | 4,700pf |
| 61 | 332K | 88 | 1K | 78 | 10nf |
| 64 | 10K | 91 | 33K | 79 | 10nf |

Figure 4A:
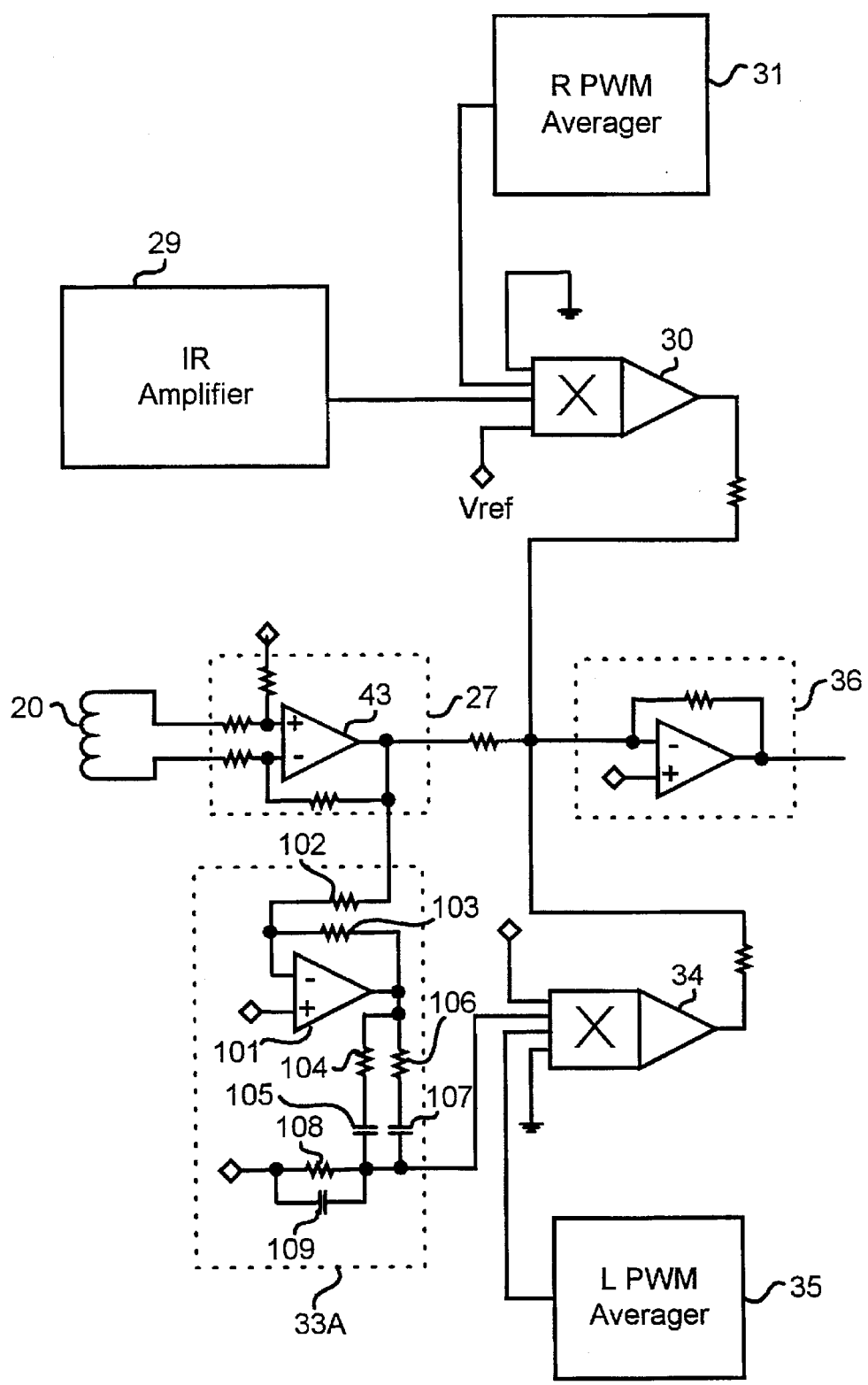
FIG. 4A is a block and schematic diagram showing an alternative configuration of circuitry for simulating an inductive portion of the VCM winding voltage.

An alternative embodiment of the differentiator circuit 33A is shown in FIG. 4A. For clarity, the L-PWM averager 35, the R-PWM averager 31, and the IR amplifier 29, are represented as functional blocks. Each respective functional block comprises circuit elements as described in connection with FIG. 4. Circuit elements appearing after the output of the summing amplifier 36 in FIG. 4A are as depicted in FIG. 4. Circuit elements that are unchanged with respect to FIG. 4 have the same reference numerals.

The output of the operational amplifier 43 of the VCM amplifier 27 is now connected to the inverting input of an operational amplifier 101 through a series resistor 102. A feedback resistor 103 is connected between the inverting input of the op-amp 101 and the output. A reference potential Vref is connected to the non-inverting terminal. Two series networks comprising resistor 104 and capacitor 105, and resistor 106 and capacitor 107, respectively, are connected together in parallel fashion and connected in series between the output of op-amp 101 and the differentiator circuit input of VGA 34. A parallel network, comprising resistor 108 and capacitor 109, is connected in series fashion between the differentiator circuit input of VGA 34 and the reference potential Vref.

Comparison of the alternative embodiment of the differentiator circuit 33A of FIG. 4A, with the differentiator 33 of FIG. 4, shows that it is now the output of operational amplifier 101 of the differentiator circuit that is differentiated, inverted and applied to the differentiator circuit input of VGA 34 as opposed to the movement command signals provided by the DAC 26. In this alternative case, the signal differentiated and provided to the VGA 34 is the total signal developed across the VCM coil winding which is extracted by the VCM amplifier 27.

Use of the signal extracted across the VCM coil winding may be desirable if increased precision of the inductance simulation is required. Using the DAC signal to obtain the inductance simulation signal requires simulating not only the VCM coil inductance but also the transfer equations of the VCM actuator driver, VCM driver amplifiers 41 and 42, and their compensation networks. Using only the signal derived across the coil winding 20 through the VCM amplifier op-amp 43, the alternative differentiator circuit 33A need only simulate the VCM coil inductance. This allows a more stable and reproducible inductive null.

If the operational amplifiers 43, 48 and 63, and VGA's 30 and 34 of FIG. 4 are constructed using CMOS transistors, a false shock indication may occur on the output of summing amplifier 36. CMOS operational amplifiers typically have input offset voltages in the range of approximately 2 to 10 mV (millivolts). Any offset voltages will be amplified by the VGAs 30 or 34, resulting in potentially large voltages applied to the summing amplifier from each leg. Since the summing amplifier itself may have a gain as high as 80, the potential exists for an output voltage in excess of the nominal Vref bias, putting the summing amplifier into saturation and rendering it inoperable for shock detection.

Figure 4B:
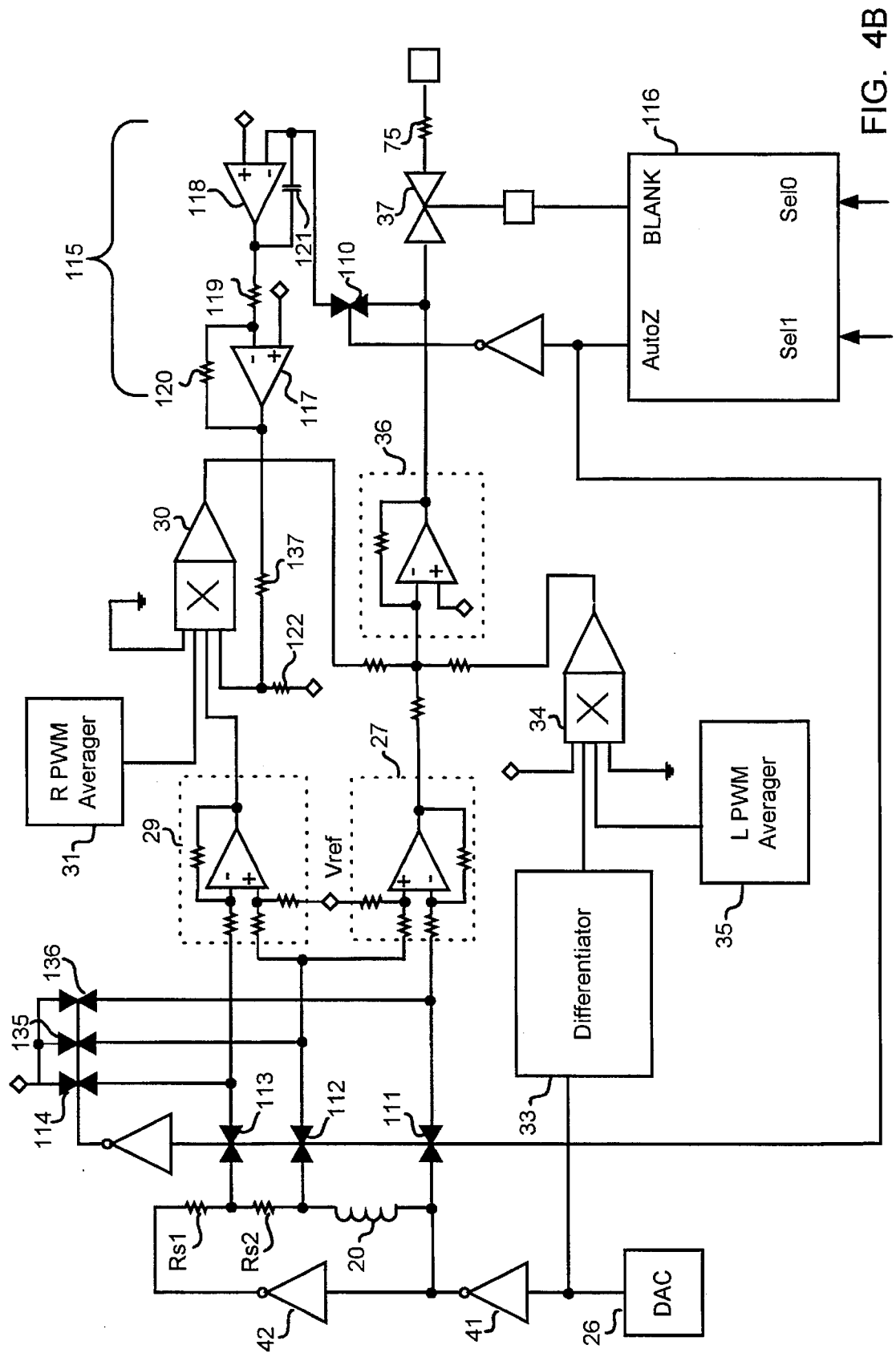
FIG. 4B is a block and schematic diagram showing an alternative embodiment of the system depicted in FIG. 3 including offset voltage compensation.

FIG. 4B shows an alternative embodiment of the shock detection circuit including circuitry for initializing the detector by providing an offset compensation voltage which zeros out the effects of variable offset voltages.

Circuitry for initializing the shock detection circuit include switches 110, 111, 112, 113, 114, 135 and 136, an offset voltage compensator, indicated generally at 115 and a selection circuit 116. Selection circuit 116 is a conventional logic circuit having two inputs, SEL0 and SEL1, connected to receive select signals from an external microcontroller. In the illustrated embodiment, selection circuit 116 has two outputs, AutoZ and BLANK, which are selectively asserted depending on the signal states applied to SEL1 and SEL2. BLANK is asserted if the signals on SEL0 and SEL1 are 0 and 0, respectively. AutoZ is asserted if the signals to SEL0 and SEL1 are 0 and 1, respectively, and the shock circuit is in normal operation if the signals on SEL0 and SEL1 are 1 and 0.

Switches 110, 111, 112, 113, 114, 135 and 136 are conventional FET gate controlled switches. During normal operation, switches 111, 112 and 113 are turned on (conductive), allowing signals developed across Rs2 and VCM coil 20 to enter the shock circuit. During initialization, AutoZ is asserted causing switches 111, 112 and 113 to be turned off (non-conductive) and switches 110, 114, 135 and 136 to turn on. In the illustrated embodiment, 110, 114, 135 and 136 are activated by the same signal applied to 111, 112 and 113, but passed through an inverter. When activated, switches 114, 135 and 136 causes a reference voltage Vref to be applied to the inputs of the IR amplifier 29 and the VCM amplifier circuit 27. The output of each circuit should now consist of only an internal voltage offset component generated by their respective op-amps. Switch 110 is on, providing the amplified offsets, appearing on the output of summing amplifier 36, to the input of the compensator 115.

Compensator 115 is constructed with two operational amplifiers 117 and 118, a resistor 119, feedback resistor 120 and holding capacitor 121, the combination configured as a sample and hold. Each op-amp has its non-inverting input tied to the reference potential Vref. The output of the compensator is connected to the reference terminal of VGA 30 through resistor 137 and to the reference potential Vref through resistors 137 and 122. Resistors 137 and 122 form a voltage divider providing a voltage division ratio of approximately 80 to 1.

An offset voltage on the output of summing amp 36 causes the compensator 115 to provide a suitable output voltage to the reference input of VGA 30 which in turn drives summing amp 36 such that its output is forced to Vref. Offset effects are thereby compensated and the shock circuit is initialized. The voltage required to compensate (zero out) the offset effects is stored on storage capacitor 121 connected between the inverting input and the output of op-amp 118. Once initialized and a voltage compensation value is stored on the storage capacitor 121, the shock circuit may resume normal operation by changing SEL0 and SEL1 from 0,1 to 1,0.

Figure 5:
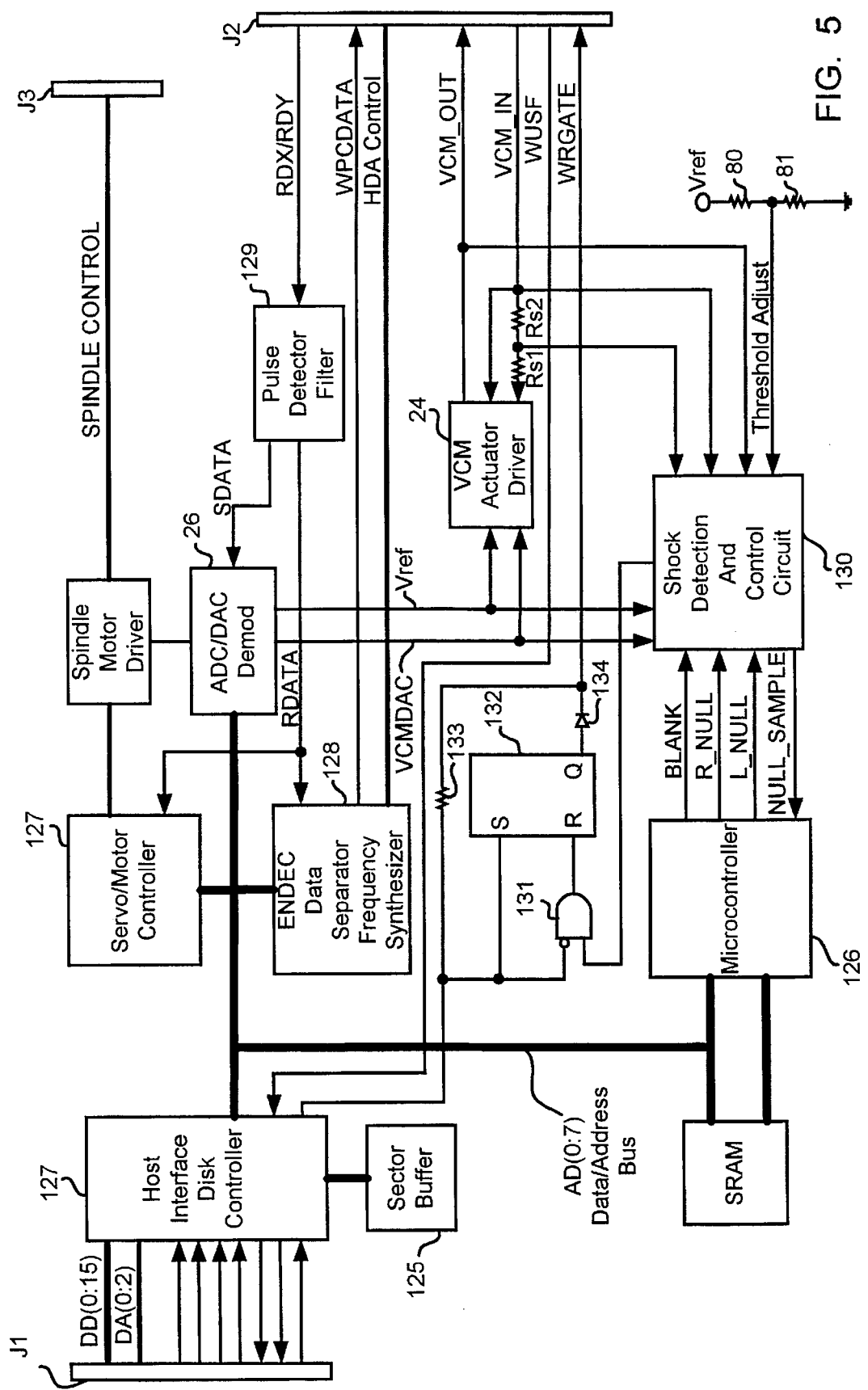
FIG. 5 is a block diagram of the drive electronics section of a hard disk drive including a shock detection integrated circuit.

FIG. 5 depicts the major electronic integrated circuit components of a disk drive, including a single, integrated circuit, rotational shock detector as described above. The integrated circuits of FIG. 5 (conventionally referred to as the Drive Electronics) are conventionally disposed on a printed circuit board which is fixed to the disk drive housing such as printed circuit board 1 of FIG. 1. Electrical connection of the drive electronics of FIG. 5 to the components within the disk drive housing are made through an HDA connector J2 to the flex circuit assembly 15 (of FIG. 1). The components contained within the housing and including the base and cover are commonly called a HDA (head/disk assembly). HDA connector J2 corresponds to the electrical connector 9 (of FIG. 1). Similarly, electrical connection of the drive electronics to a host computer's host system bus is made through host system bus interface connector J1.

The drive electronics of FIG. 5 include a host interface disk controller (HIDC) 124 which directly connects to the host system bus via interface connector J1. HIDC 124 integrates conventional formatter/controller, CRC/ERC generator/checker, host interface and buffer manager functions into a single integrated circuit. The HIDC may be a commercially available device such as the WD61C23 HIDC from Western Digital Corp. of Irvine, Calif. A 32Kbyte sector buffer 125 is connected to the HIDC and enhances data throughput of the disk drive by buffering sector data between the disk drive and the host system bus.

A 16-bit microcontroller 126 controls and coordinates the activity of the HDA and HIDC. The microcontroller receives and sends command or status information over an internal multiplexed address/data bus (AD(0:7)). Also connected to the internal address/data bus are a servo/motor controller 127, an ENDEC/data separator/frequency synthesizer 128 and an ADC/DAC/demodulator 26. Servo controller 127 and ENDEC 128 are also connected to the HIDC 124 via a disk control bus.

Servo controller 127 provides servo discrimination, track address capture and spindle motor control, while the ENDEC 128 handles the read/write signals between the HIDC and the read channel circuitry; receiving read data from the read/write heads via read/write preamplifier 16 (of FIG. 1) and a pulse detector 129, and providing write data to the heads via read/write preamplifier 16 (of FIG. 1). Pulse detector 129 converts analog read data received from the read/write preamplifier 16 (of FIG. 1) to a digital data stream (RDATA) which is provided to ENDEC 128 wherein data is separated from synchronization and location information in a conventional manner. The data is transferred to HIDC 124 which temporarily stores it in the sector buffer 125 until the host system is ready to receive it over the interface connector J1. The servo controller 127 may be a commercially available device such as the WD61C12 Servo/Motor Controller from Western Digital Corp. of Irvine, Calif. Similarly, the ENDEC 128 may be a commercially available device such as the WD19C27 ENDEC/Data Separator/Frequency Synthesizer from Western Digital Corp. of Irvine, Calif.

When the read/write head passes over a servo sector 22 (of FIG. 2) the servo data stream (SERVODATA) is directed to ADC/DAC/demodulator 26. Servo data is demodulated in order to determine head position relative to the track centerline and the demodulated data is provided to the servo controller 127 and microcontroller 126 via the internal multiplexed bus. Firmware within the microcontroller determines the degree of head misalignment (if any) and commands the servo controller to move the head back in alignment with the track centerline. Head movement commands are directed to a DAC (digital-to-analog converter) contained within ADC/DAC 26 which converts digital command signals from the microcontroller and servo controller into analog signals. Analog head movement signals (VCMDAC) and a voltage reference signal (VREF) are sent to a VCM actuator driver integrated circuit 24 which corresponds to VCM driver circuit 24 of FIG. 2 and FIG. 3. The VCM actuator driver moves the actuator assembly by providing VCM drive signals (VCMIN and VCMOUT) to the VCM coil winding via flex cable 17 attached to flex circuit 15 of FIG. 1.

A write unsafe signal (WUSF) is provided to HIDC 124 by the read/write preamplifier 16 (of FIG. 1). WUSF is asserted to a logic high by the preamp during various conventional write unsafe conditions such as, for example, a head crash or voltage failure in the preamp circuit.

Write operations are typically preceded by the assertion of WRGATE (write gate) to a logic low by the HIDC 124 to the preamp indicating that a write operation is proceeding. In the illustrated embodiment, WUSF is typically always in the high state unless a write operation is desired and WRGATE is asserted low to the preamp. WUSF is deasserted by the preamp in response to WRGATE if all is well. If a write unsafe condition exists, WUSF remains high, causing WRGATE to be returned to the high state. In response to such a condition (WRGATE and WUSF both high), the HIDC 124 commands the ENDEC 128 to soft abort any write operation in progress.

The output of a shock detection circuit 130 is connected to the WRGATE signal line by triggering logic, including a logic gate 131, an SR flip flop 132, a resistor 133 and a diode 134. When a rotational shock is detected, the shock detector 130 asserts SHK to a logic high in response. Since WRGATE is initially low, it is ANDed, at an inverting input of the AND gate 131, with the high SHK signal, thereby providing a high to the R input of the SR flip-flop 132 and, in turn, a high at the output. This serves to pull WRGATE up to a high at the preamp, causing any write operation in progress to immediately cease, and WUSF to be asserted to the HIDC. Resistor 133 functions to allow the output of the flip-flop to remain in a high state even when WRGATE is being driven low by the HIDC. Diode 134 functions to allow SR flip-flop 132 to only pull WRGATE high. Diode 134 blocks the flip-flop from pulling WRGATE low, thereby allowing an erroneous write.

If WUSF is asserted by either the preamp or the shock detector during a write operation, the HIDC then performs a conventional write retry, in a manner described in greater detail below Alternatively, the SHK signal may be connected directly to the WUSF signal line, asserting WUSF directly. However, due to inherent signal processing delays in the HIDC after receipt of WUSF, a write may proceed for a time and some data may be written to an incorrect track before the write operation is aborted. Connection of SHK to the WRGATE signal line allows the shock event to immediately close the write gate, aborting any write in progress.

The microcontroller provides R_NULL and L_NULL signals to the shock detection circuit 130. Both R_NULL and L_NULL are output signals from programmable PWMs conventionally provided by most microcontrollers. In the illustrated embodiment, a microcontroller, such as an Intel 80C196KD, has two PWM ports, one of which is used to provide the R_NULL signal, the other provides L_NULL. R_NULL is connected to the shock detection circuit 130 through the input terminals 53, 54 and 55 of the R-PWM averager 31 of FIG. 4 and is used to set the gain of the shock detector's IR amplifier through its gain element. Similarly, L_NULL is provided to the input terminal of the L-PWM averager 35 of FIG. 4 and is used to set the gain of the differentiator through VGA 34.

A BLANK signal, applied to the blanking terminal, is provided by the microcontroller under the control of the drive's servo firmware. This signal is asserted by the servo firmware 3 microseconds ±1 microsecond before writing to the VCM DAC. The BLANK signal is de-asserted by the servo firmware about 50 microseconds after the DAC write. This delay before de-assertion is a function of the design of the VCM winding, and is used to remove an initial high frequency spike as described previously.

The VCM drive signal (VCMOUT) provided by VCM actuator driver 24 to the VCM coil is connected to the shock detection circuit 130 as an input, as is the return signal (VCMIN). These are connected in turn to inverting and non-inverting inputs, respectively, of VCM amplifier 27 of FIG. 4. A third input is taken from VCMIN after the signal is dropped across Rs2. This input and the direct VCMIN input are provided to the IR amplifier 29 of FIG. 4.

Threshold adjust resistors 80 and 81, of FIG. 4, are provided as external components mounted on the printed circuit board, with a threshold adjust signal line connected to the shock detection circuit as an input. This signal is in turn connected to the non-inverting input of operational amplifier 82 of FIG. 4.

Two additional signal inputs are provided to the shock detection circuit 130 by the ADC/DAC 26; VCMDAC and VREF. VCMDAC is connected to the input of the differentiator circuit of FIG. 4 and is the same signal provided to the VCM actuator driver circuit 24 that tells the driver the current to provide the VCM coil winding. VREF is an arbitrary reference voltage, typically 2.15 V, or about half the supply voltage of the ADC/DAC.

A NULL_SAMPLE output signal is connected to the microcontroller 126 and is used by the microcontroller's analog-to-digital converter to sample the output from the summing amplifier 36 of FIG. 4. This output is used by the calibration firmware, in a manner described below, to null out the VCM winding design, temperature and aging tolerances that would otherwise degrade the shock detector's sensitivity.

Figure 6:
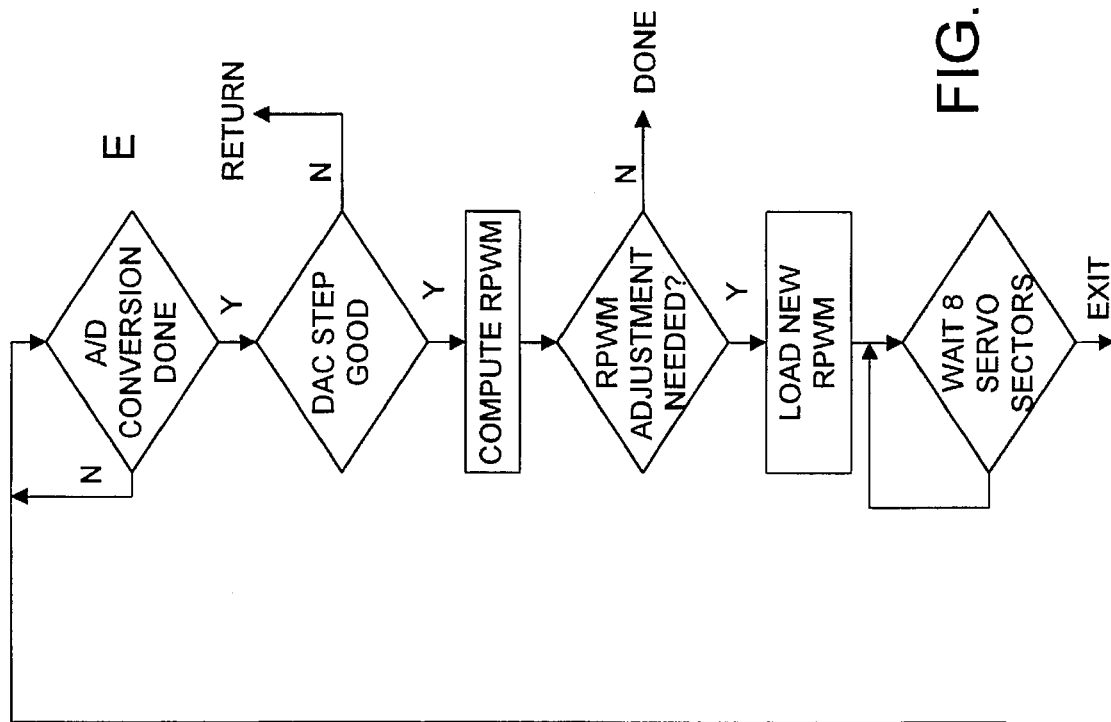
FIG. 6 is a firmware flowchart illustrating the sequence of operations in a hulling calibration.
Figure 6:
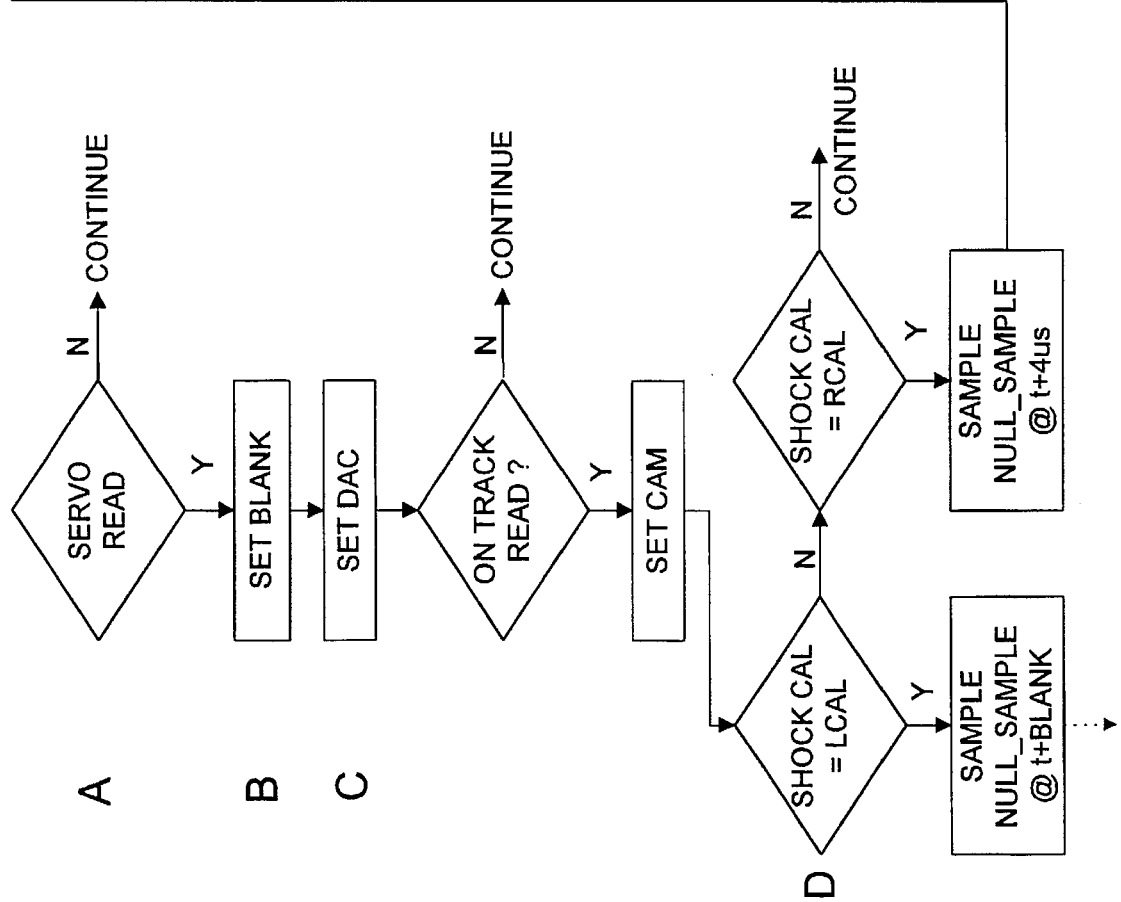
Figure 7:
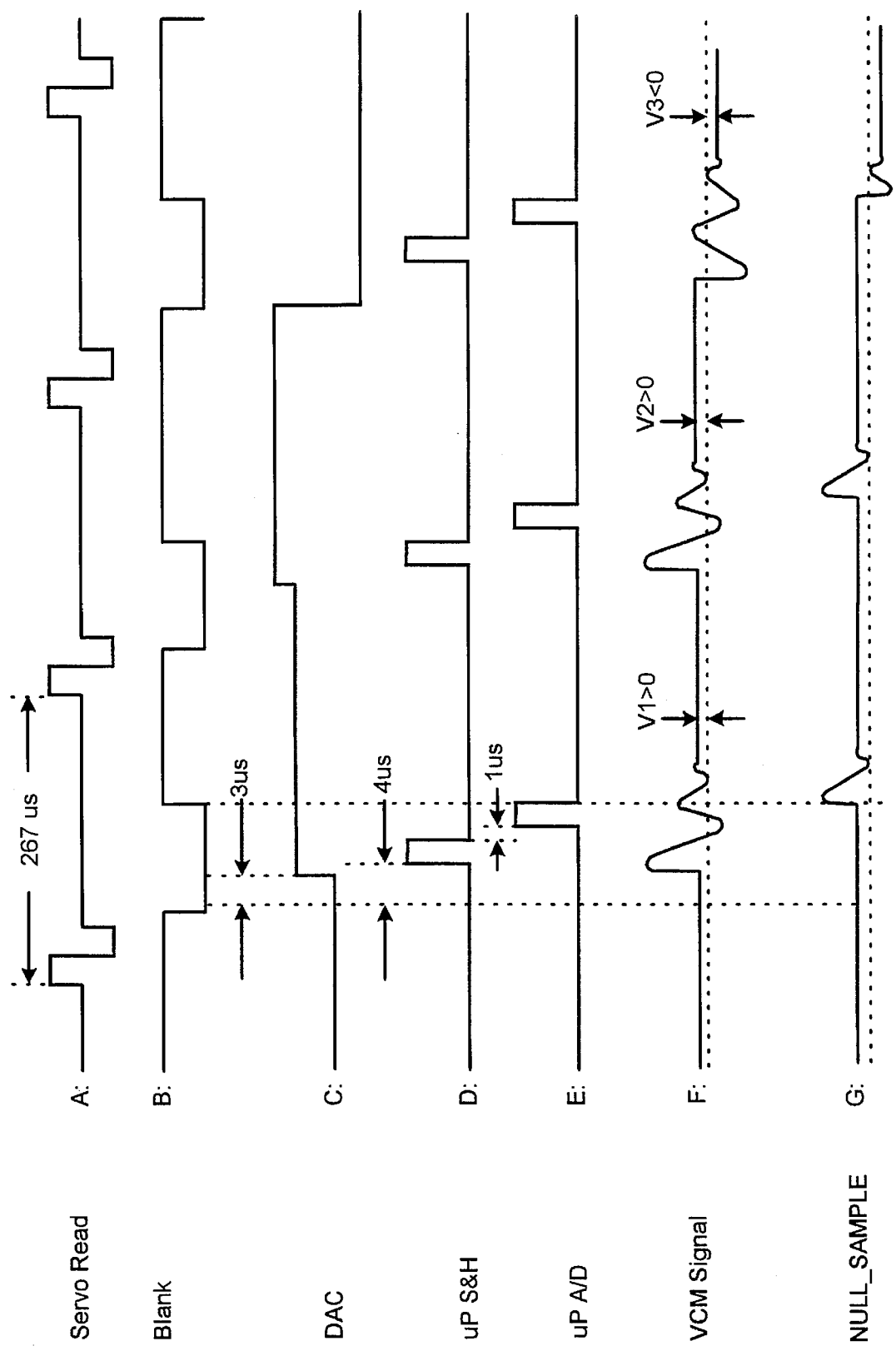
FIG. 7 is a waveform diagram illustrating the signal sequences in a nulling calibration.

Calibration of the shock detector's resistive and inductive nulls can be understood with reference to the firmware flow chart of FIG. 6 and the waveform timing diagram of FIG. 7.

Initial default values for L-NULL and R_NULL are placed in ROM during the manufacturing process. During a disk drive power up sequence, the microcontroller initializes its internal PWMs with the default L_NULL and R_NULL values and powers-up the shock integrated circuit. The microcontroller also provides a BLANK signal in synch with the spaced-apart servo sectors.

If WUSF is asserted during a write operation, a shock null calibration sequence is performed to calibrate the shock detector's simulation circuits. Following calibration the write command is retried. If a write command is successful, no further calibration is needed and the default values for L_NULL and R_NULL are kept as nominal.

Referring to FIG. 6 and FIG. 7, shock null calibration is performed as a subroutine of a disk drive's servo interrupt firmware. For convenience, the steps in the servo code of FIG. 6 and the corresponding waveform in the timing diagram of FIG. 7 are labeled with the same reference letter.

As the read/write head passes over one of the spaced apart servo sectors provided on a disk, the servo code initiates a preprogrammed sequence of operations. At SERVO READ, A, servo burst information is read by the read write head in order to determine the position of the head with respect to the track centerline. Timing of both the occurrence and duration of a servo sector are predetermined quantities and provide a timing baseline for operations synchronized to a servo sample. At B, SET BLANK is commanded to the microcontroller which asserts a BLANK signal to the shock detection circuit's blanking gate (37 in FIG. 4).

3 microseconds following SET BLANK, the servo code commands SET DAC at C. During SERVO READ, head position information is processed by the microcontroller and head position update information is calculated so as to move the head back to the track centerline. At SET DAC, the ADC/DAC is updated with the new head movement information and, in turn, provides the VCM actuator driver with an analog signal commanding a current to be applied to the VCM coil, thereby moving the head. The timing of SET DAC and SET BLANK from SERVO READ is arbitrary and depends only on the time required by the microcontroller to process servo information and calculate an update.

Following SET DAC, the servo code conventionally determines whether the read/write heads are sufficiently on track for a data read operation. If this condition is false, a second servo sample is taken, typically 267 microseconds later, when the next servo sector is read. When the condition is true, the servo code sets up a conventional internal timer called a CAM and performs the calibration sequence. Although both resistance and inductance calibration are performed together within a code loop and follow the same firmware structural sequence, the CAM timing is different. For reasons explained below, the resistance calibration sequence will be followed in detail first with the inductance calibration following. Under control of the CAM at D, 4 microseconds following the assertion of BLANK, the servo code commands the microcontroller to sample and hold the voltage value at the shock detection circuit's NULL_ SAMPLE output. At E, typically 1 microsecond after the microcontroller's sample and hold settles, an ADC within the microcontroller is commanded to convert the SHOCK_NULL sample voltage into digital values. Alternatively, AutoZ may be commanded to zero out the effects of internal offset voltages prior to sampling the NULL_SAMPLE output.

In FIG. 7, waveform G represents the signal typically appearing at the shock detector's NULL_SAMPLE output. Waveform F represents the signal that would appear at the NULL_SAMPLE output if BLANK were not asserted. The shock detection circuit's summing amplifier, blank gate and filter (36, 36 and 38 respectively in FIG. 4) function as a sample and hold circuit for voltages appearing at the output of the summing amplifier immediately prior to the assertion of the BLANK signal. The high frequency spike due to the DAC transition shown in F is removed by BLANK in the G waveform, but an AC inductance (L di/dt) component tail remains after BLANK is deasserted. When the inductance tail settles, a DC offset component remains from the sample and hold action of the summing amplifier and represents the difference between the resistive component extracted by the VCM amplifier and the resistive component simulated by the R simulator 28. In the example of FIG. 7, the first two sample voltages, V1 and V2, are chosen to be positive, representing a current commanded by the DAC to move the head in one direction. A third sample voltage V3 is chosen to be negative, representing a current commanded by the DAC to move the head in the other direction.

Returning to FIG. 6, following the first NULL_SAMPLE extraction, a second SERVO READ is performed at the next occurring servo sector 267 microseconds following the first. The SET BLANK, SET DAC and initialize CAM procedure is repeated and a second NULL_SAMPLE voltage is sampled and held by the microcontroller. At DAC STEP GOOD, the polarity of the DAC step is evaluated against the polarity of the prior DAC step. In order to account for offsets in both directions in the shock detection circuit, two successive DAC steps must be of opposite polarities, commanding head movement in one direction then in the other. This condition is shown by V2 and V3 in waveform F in FIG. 7. The calibration sequence is repeated in the servo code for successive servo sectors until this condition is true.

If DAC STEP GOOD is true, the microcontroller algebraically adds the NULL_SAMPLE voltages obtained from two successive DAC steps in opposite directions. The sum of the two values represents the total error between the resistance simulated and the resistance extracted by the shock detection circuit. The microcontroller converts the error term into a count value (R_NULL) for use by its internal PWM which then applies the new PWM count to the input terminals of the R-PWM averager (31 of FIG. 4). As a final step, the calibration process is repeated once again in order to verify that resistance is properly nulled, and that NULL_SAMPLE is approximately zero during BLANK time.

Referring to FIG. 6, if an inductance calibration is desired, it is performed after the resistance calibration. However, the CAM timer directs the microcontroller to begin sampling the NULL_SAMPLE output of the shock detection circuit at approximately 66 microseconds after BLANK is deasserted. This is when the inductance tail signal is present in waveform F of FIG. 7. Since the inductance tail is an AC signal having signal levels that oscillate both above and below a nominal reference zero level, the microcontroller integrates the area under the inductance curve. If inductance is properly nulled, the area under the curve which is above the reference zero should equal the area of the curve falling below the reference zero and the integration summation should equal zero. If required, a new value is calculated for L_NULL and a new PWM count is applied to the L_NULL terminal of the L-PWM averager (35 of FIG. 4). The new L_NULL value is verified in the same manner as for R_NULL.

At this time, calibration is complete, and the servo code returns control of disk drive operations to the HDC controller which may now retry a write operation which was aborted as a result of the assertion of WUSF.

A statistical procedure is used to determine the initial values of R_NULL and L_NULL which are placed in ROM as part of the servo firmware code during the manufacturing process. It has been determined that successive calibration iterations, as described above, result in the same or similar initial nulling values across a statistically significant sample of integrated circuit chips and disk drives. Those values are written into ROM of the disk drive as initial values of R_NULL and L_NULL. However, the inductance values of the VCM winding have been found to vary only slightly over time, with little to no modifications required to L_NULL.

In the present embodiment of the invention, the length of the BLANK signal is varied until the area integration of the inductance tail equals zero. This value for BLANK time is set in the servo firmware code and is used in all further calibration procedures. Since conventional microcontroller PWMs have a count length of 256 counts, an arbitrary value of 128 PWM counts are chosen to represent the initial L_NULL value prior to the variation of the BLANK signal length. Under most disk drive operating conditions, the initial value is sufficient to accurately control the gain of the inductance simulation section in the shock detection circuit. Therefore, the inductance calibration procedure, during normal operation, is not performed.

If desired, the microcontroller may be programmed to assert an R_NULL and/or an L_NULL bit in a programmable status register upon the receipt of a WUSF signal. The servo code may be directed to ascertain the status of those bits prior to executing the corresponding branch of the calibration routine; executing a branch if the appropriate bit is asserted in the register. The user may program the microcontroller to assert the L_NULL status bit, thus commanding the servo code to perform an inductance calibration, after the occurrence of a specific event. Inductance calibrations may be performed once every one hundred WUSF assertions, once every year or whenever otherwise desired.

The described BEMF sensing rotational shock detection system provides a reliable and inexpensive way to detect physical shocks to the disk drive by sensing unintentional rotations of a disk drive actuator assembly which result from such shocks. The VCM resistance and inductance simulators, together with the active nulling operation, allows the BEMF developed in the VCM winding from a rotational shock to be successfully extracted from much larger VCM signals that accompany normal operation. While a particular embodiment of the invention has been shown and described, numerous variations and alternate embodiments will occur to those skilled in the art. Accordingly, it is intended that the invention be limited only in terms of the appended claims.

We claim:

1. A disk drive comprising:
   a transducer head;
   channel circuit means for processing write and read signals provided to and received from the head;
   a rotating magnetic storage disk having a recording surface containing concentric tracks having data sectors and embedded servo sectors;

rotatable actuator means including means for supporting the head adjacent the recording surface and a voice coil motor (VCM) for moving the head across the recording surface, the VCM including a coil winding having a winding resistance R and a winding inductance L;

sampled-data servo means for controlling the position of the head during head positioning operations including track-following operations, the servo means including actuator driver circuit means for applying a position control signal (PCS) to the coil winding;

the coil winding producing a winding voltage, a first variable portion of which is induced by physical shock and a second variable portion of which is caused by the PCS;

signal processing means for producing an analog $V_S$ signal representative of the shock-induced portion of the winding voltage, including first input means responsive to the winding voltage for producing a $V_M$ signal representing the winding voltage, second input means responsive to the winding current for producing a $I_M$ signal representing the current in the coil winding, R-gain means responsive to the $I_M$ signal for producing a $V_R$ signal simulating the voltage drop across the winding resistance R, third input means responsive to the PCS for producing a $V_L$ signal simulating the voltage drop across the winding inductance L, and summing means for subtracting the $V_L$ signal and the $V_R$ signal from the $V_M$ signal, thereby producing the analog $V_S$ signal, wherein $V_S = V_M - V_R - V_L$;

threshold circuit means responsive to the analog $V_S$ signal for producing a digital SHK signal indicating that an off-track condition has been caused by a physical shock; and means operatively responsive to the digital SHK signal for controlling the channel circuit means during track-following operations.

2. The disk drive of claim 1 wherein the R-gain means produces the $V_R$ signal responsive to a R_NULL gain control signal, the disk drive further comprising:

calibration means for compensating for an intervening change ΔR in the winding resistance R including sampling means for receiving a NULL_SAMPLE signal representing the $V_S$ signal, and first output means responsive to the NULL_SAMPLE signal for producing the R_NULL gain control signal in response to which the R-gain means produces the $V_R$ signal, thereby simulating the voltage drop across the changed winding resistance R+ΔR.

3. The disk drive of claim 2 wherein the calibration means is also for compensating for an intervening change ΔL in the winding inductance L, the disk drive further comprising:

in the third input means, L-gain means for producing the $V_L$ signal responsive to a L_NULL gain control signal; and in the calibration means, second output means responsive to the NULL_SAMPLE signal for producing the L_NULL gain control signal in response to which the L-gain means produces the $V_L$ signal, thereby simulating the voltage drop across the changed winding inductance L+ΔL.

4. The disk drive of claim 3 further comprising:

blanking gate means for blocking, in synchrony with each servo phase, the threshold circuit means from receiving the $V_S$ signal for a predetermined blanking time interval.

5. The disk drive of claim 4 further comprising:

in the blanking gate means, means for adjusting the predetermined blanking time interval so that the average $V_L$ signal outside the blanking time interval is zero.

6. The disk drive of claim 1 further comprising:

in the third input means, differentiator means for producing a differential signal representing the time-rate-of-change of the PCS, wherein the differential signal is the $V_L$ signal simulating the voltage drop across the winding inductance L.

7. The disk drive of claim 1 further comprising:

in the third input means, differentiator means for producing a differential signal representing the time-rate-of-change of the $V_M$ signal, wherein the differential signal is the $V_L$ signal simulating the voltage drop across the winding inductance L.

8. The disk drive of claim 1 further comprising:

blanking gate means for blocking, in synchrony with each servo phase, the threshold circuit means from receiving the $V_S$ signal for a predetermined blanking time interval.

9. An integrated circuit for processing a shock-induced signal contained in a winding voltage developed across a coil winding of a rotary voice coil motor, the winding voltage including the voltage established across a coil winding resistance R and a coil winding inductance L by a position control signal (PCS), the integrated circuit comprising:

first input means responsive to the winding voltage for producing a $V_M$ signal representing the winding voltage;

second input means responsive to the winding current for producing a $I_M$ signal representing the current in the coil winding;

R-gain means responsive to the $I_M$ signal for producing a $V_R$ signal simulating the voltage drop across the winding resistance R;

third input means responsive to the PCS for producing a $V_L$ signal simulating the voltage drop across the winding inductance L;

summing means for subtracting the $V_L$ signal and the $V_R$ signal from the $V_M$ signal, thereby producing the analog $V_S$ signal, wherein $V_S = V_M - V_R - V_L$; and threshold circuit means for producing a digital SHK signal responsive to the analog $V_S$ signal exceeding a predetermined threshold.

10. A circuit for processing a shock-induced signal contained in a winding voltage developed across a coil winding of a rotary voice coil motor, the winding voltage including the voltage established across a coil winding resistance R and a coil winding inductance L by a position control signal (PCS), the circuit comprising:

signal processing means including first input means responsive to the winding voltage for producing a $V_M$ signal representing the winding voltage, second input means responsive to the winding current for producing a $I_M$ signal representing the current in the coil winding, R-gain means responsive to the $I_M$ signal for producing a $V_R$ signal simulating the voltage drop across the winding resistance R, third input means responsive to the PCS for producing a $V_L$ signal simulating the voltage drop across the winding inductance L, and summing means for subtracting the $V_L$ signal and the $V_R$ signal from the $V_M$ signal, thereby producing the analog $V_S$ signal, wherein $V_S = V_M - V_K - V_L$;

threshold circuit means for producing a digital SHK signal responsive to the analog $V_S$ signal exceeding a predetermined threshold; and calibration means for compensating for an intervening change $\Delta R$ in the winding resistance R including sampling means for receiving a NULL_SAMPLE signal representing the $V_S$ signal, and first output means responsive to the NULL_SAMPLE signal for producing the R_NULL gain control signal in response to which the R-gain means produces the $V_R$ signal, thereby simulating the voltage drop across the changed winding resistance $R+\Delta R$.

11. The circuit of claim 10 wherein the calibration means is also for compensating for an intervening change $\Delta L$ in the winding inductance L, the disk drive further comprising:

in the third input means, L-gain means for producing the $V_L$ signal responsive to a L_NULL gain control signal; and in the calibration means, second output means responsive to the NULL_SAMPLE signal for producing the L_NULL gain control signal in response to which the L-gain means produces the $V_L$ signal, thereby simulating the voltage drop across the changed winding inductance $L+\Delta L$.

12. The circuit of claim 11 further comprising:

blanking gate means for blocking, in synchrony with each servo phase, the threshold circuit means from receiving the $V_S$ signal for a predetermined blanking time interval.

13. The circuit of claim 12 further comprising:

in the blanking gate means, means for adjusting the predetermined blanking time interval so that the average $V_L$ signal outside the blanking time interval is zero.

14. The circuit of claim 10 further comprising:

in the third input means, differentiator means for producing a differential signal representing the time-rate-of-change of the PCS, wherein the differential signal is the $V_L$ signal simulating the voltage drop across the winding inductance L.

15. The circuit of claim 10 further comprising:

in the third input means, differentiator means for producing a differential signal representing the time-rate-of-change of the $V_M$ signal, wherein the differential signal is the $V_L$ signal simulating the voltage drop across the winding inductance L.

16. The circuit of claim 10 further comprising:

blanking gate means for blocking, in synchrony with each servo phase, the threshold circuit means from receiving the $V_S$ signal for a predetermined blanking time interval.

* * * * *